(12) United States Patent
Hara et al.

(10) Patent No.: US 8,149,451 B2
(45) Date of Patent: Apr. 3, 2012

(54) INFORMATION PROCESSING DEVICE, INFORMATION EMBEDDING METHOD, AND PROGRAM

(75) Inventors: Takayuki Hara, Tokyo (JP); Takahiro Yagishita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 939 days.

(21) Appl. No.: 12/168,218

(22) Filed: Jul. 7, 2008

(65) Prior Publication Data

US 2009/0021794 A1    Jan. 22, 2009

(30) Foreign Application Priority Data

Jul. 18, 2007 (JP) .................... 2007-187628
Jun. 30, 2008 (JP) .................... 2008-171634

(51) Int. Cl.
*G06F 3/12* (2006.01)
*G06K 15/00* (2006.01)

(52) U.S. Cl. ............ 358/1.17; 358/1.13; 358/1.16; 358/3.28

(58) Field of Classification Search ............ 358/1.9, 358/3.01, 3.28, 1.13, 1.16, 1.17
See application file for complete search history.

(56) References Cited

U.S. PATENT DOCUMENTS

| | | | |
|---|---|---|---|
| 4,459,611 A | 7/1984 | Arai et al. | |
| 2005/0180594 A1 | 8/2005 | Isogai | |
| 2006/0147084 A1 | 7/2006 | Hara | |
| 2007/0110273 A1 * | 5/2007 | Hara | 382/100 |

FOREIGN PATENT DOCUMENTS

| | | |
|---|---|---|
| CN | 1529246 A | 9/2004 |
| JP | 2000-059610 | 2/2000 |
| JP | 2000-216983 | 8/2000 |
| JP | 2001-333267 | 11/2001 |
| JP | 2006-135922 | 5/2006 |

OTHER PUBLICATIONS

Robert Scealy et al, "Performance Measurement of Watermark Embedding Patterns" Digital Watermarking [Lecture Notes in Computer Science] vol. 2939 Feb. 12, 2004 pp. 77-85.
Wheeler G E et al, "Weighted segmented digital watermarking" Digital Watermarking [Lecture Notes in Computer Science] vol. 3304 pp. 89-100.
Extended European Search Report.
Chinese Office Action dated Apr. 20, 2011.

* cited by examiner

Primary Examiner — James A. Thompson
(74) Attorney, Agent, or Firm — IPUSA, PLLC

(57) ABSTRACT

In an information processing device which embeds a number of partial information items produced from predetermined information in an image, an image dividing unit divides an image into a number of division images in a lattice formation to generate the division images. An information assigning unit assigns the partial information items to the division images generated by the image dividing unit. An information embedding unit embeds the partial information items assigned by the information assigning unit, in the division images. The information assigning unit assigns all the partial information items to a set of division images located in a predetermined direction.

11 Claims, 18 Drawing Sheets

FIG.3A
RELATED ART

|   |   |   |   |   |   |   |   |
|---|---|---|---|---|---|---|---|
| 0 | 1 | 2 | 3 | 4 | 5 | 6 | 7 |
| 0 | 1 | 2 | 3 | 4 | 5 | 6 | 7 |
| 0 | 1 | 2 | 3 | 4 | 5 | 6 | 7 |
| 0 | 1 | 2 | 3 | 4 | 5 | 6 | 7 |
| 0 | 1 | 2 | 3 | 4 | 5 | 6 | 7 |
| 0 | 1 | 2 | 3 | 4 | 5 | 6 | 7 |
| 0 | 1 | 2 | 3 | 4 | 5 | 6 | 7 |
| 0 | 1 | 2 | 3 | 4 | 5 | 6 | 7 |

DATA ALIGNMENT IS THE SAME

PARTIAL INFORMATION ITEMS ARE ASSIGNED PER BIT TO RESPECTIVE DIVISION IMAGES BY THE SAME RULE

FIG.3B

|   |   |   |   |   |   |   |   |
|---|---|---|---|---|---|---|---|
| 0 | 5 | 2 | 7 | 4 | 1 | 6 | 3 |
| 7 | 4 | 1 | 6 | 3 | 0 | 5 | 2 |
| 6 | 3 | 0 | 5 | 2 | 7 | 4 | 1 |
| 5 | 2 | 7 | 4 | 1 | 6 | 3 | 0 |
| 4 | 1 | 6 | 3 | 0 | 5 | 2 | 7 |
| 3 | 0 | 5 | 2 | 7 | 4 | 1 | 6 |
| 2 | 7 | 4 | 1 | 6 | 3 | 0 | 5 |
| 1 | 6 | 3 | 0 | 5 | 2 | 7 | 4 | j
i →

DATA ALIGNMENT DIFFERS

PARTIAL INFORMATION ITEMS ARE ASSIGNED PER BIT TO RESPECTIVE DIVISION IMAGES BY DIFFERENT RULES

FIG.6

| PARTIAL INFORMATION ITEM IDENTIFIER | #0 | #1 | #2 | ... | #N-1 |
|---|---|---|---|---|---|
| PARTIAL INFORMATION ITEM (LIKELIHOOD FACTOR) | 0 (0.8) | 1 (0.7) | 0 (0.9) | ... | 1 (0.9) |
| | 0 (0.7) | 1 (0.6) | 0 (0.8) | ... | 0 (0.6) |
| | 1 (0.6) | — | 1 (0.7) | ... | — |
| | 1 (0.7) | — | — | ... | — |

BECAUSE INFORMATION IS EMBEDDED IN IMAGE REPEATEDLY, TWO OR MORE CANDIDATE PARTIAL INFORMATION ITEMS EXIST. FINAL PARTIAL INFORMATION ITEMS IN THIS CASE ARE DETERMINED AS FOLLOWS.

IN CASE OF PARTIAL INFORMATION ITEM #0,

PRODUCT OF LIKELIHOOD FACTORS OF CANDIDATES AS BEING LIKELY TO BE "0": 0.8*0.7*(1−0.6)*(1−0.7) = 0.0672
PRODUCT OF LIKELIHOOD FACTORS OF CANDIDATES AS BEING LIKELY TO BE "1": (1−0.8)*(1−0.7)*0.6*0.7 = 0.0252
COMPARISON OF THE PRODUCTS: 0.0673 > 0.0252

FINAL PARTIAL INFORMATION ITEM FOR IDENTIFIER #0 IS DETERMINED AS BEING "0"

| FINAL EXTRACTED INFORMATION | 0 | 1 | 0 | ... | 1 |
|---|---|---|---|---|---|

FIG.8

FIRST PAGE

| 0 | 3 | 6 | 9 |
|---|---|---|---|
| 5 | 8 | 11 | 1 |
| 10 | 13 | 16 | 2 |
| 15 | 1 | 4 | 7 |

SECOND PAGE

| 2 | 5 | 8 | 11 |
|---|---|---|---|
| 7 | 10 | 13 | 16 |
| 12 | 15 | 1 | 4 |
| 0 | 3 | 6 | 9 |

THIRD PAGE

| 4 | 7 | 10 | 13 |
|---|---|---|---|
| 9 | 12 | 15 | 1 |
| 14 | 0 | 3 | 6 |
| 2 | 5 | 8 | 11 |

90 DEGREE ROTATION (COUNTERCLOCKWISE)

| 7 | 12 | 0 | 5 | 10 | 15 | 3 | 8 | 13 |
|---|----|---|---|----|----|---|---|----|
| 4 | 9 | 14 | 2 | 7 | 12 | 0 | 5 | 10 |
| 1 | 6 | 11 | 16 | 4 | 9 | 14 | 2 | 7 |
| 15 | 3 | 8 | 13 | 1 | 6 | 11 | 16 | 4 |
| 12 | 0 | 5 | 10 | 15 | 3 | 8 | 13 | 1 |
| 9 | 14 | 2 | 7 | 12 | 0 | 5 | 10 | 15 |
| 6 | 11 | 16 | 4 | 9 | 14 | 2 | 7 | 12 |
| 3 | 8 | 13 | 1 | 6 | 11 | 16 | 4 | 9 |
| 0 | 5 | 10 | 15 | 3 | 8 | 13 | 1 | 6 |

0 DEGREE ROTATION

| 13 | 10 | 7 | 4 | 1 | 15 | 12 | 9 | 6 |
|----|----|---|---|---|----|----|---|---|
| 8 | 5 | 2 | 16 | 13 | 10 | 7 | 4 | 1 |
| 3 | 0 | 14 | 11 | 8 | 5 | 2 | 16 | 13 |
| 15 | 12 | 9 | 6 | 3 | 0 | 14 | 11 | 8 |
| 10 | 7 | 4 | 1 | 15 | 12 | 9 | 6 | 3 |
| 5 | 2 | 16 | 13 | 10 | 7 | 4 | 1 | 15 |
| 0 | 14 | 11 | 8 | 5 | 2 | 16 | 13 | 10 |
| 12 | 9 | 6 | 3 | 0 | 14 | 11 | 8 | 5 |
| 7 | 4 | 1 | 15 | 12 | 9 | 6 | 3 | 0 |

FIG.13

| FIRST CANDIDATE EXTRACTED INFORMATION | 1 | 0 | 1 | 1 | ... | 1 |
| --- | --- | --- | --- | --- | --- | --- |
| SECOND CANDIDATE EXTRACTED INFORMATION | 0 | 1 | 1 | 1 | ... | 0 |
| THIRD CANDIDATE EXTRACTED INFORMATION | 1 | 1 | 0 | 0 | ... | 0 |
| FOURTH CANDIDATE EXTRACTED INFORMATION | 0 | 1 | 0 | 1 | ... | 1 |

BECAUSE IMAGE ROTATION BY 90 DEGREES IS ASSUMED,
TWO OR MORE CANDIDATE EXTRACTED INFORMATION ITEMS EXIST.
FINAL EXTRACTED INFORMATION IN THIS CASE IS DETERMINED AS FOLLOWS.

LIKELIHOOD FACTOR OF FIRST CANDIDATE EXTRACTED INFORMATION: 0.287
LIKELIHOOD FACTOR OF SECOND CANDIDATE EXTRACTED INFORMATION: 0.211
LIKELIHOOD FACTOR OF THIRD CANDIDATE EXTRACTED INFORMATION: 0.252
LIKELIHOOD FACTOR OF FOURTH CANDIDATE EXTRACTED INFORMATION: 0.672
LIKELIHOOD FACTORS ARE COMPARED: 0.672 > 0.287 > 0.252 > 0.211

FOURTH CANDIDATE EXTRACTED INFORMATION IS DETERMINED AS BEING FINAL EXTRACTED INFORMATION

| FINAL EXTRACTED INFORMATION | 0 | 1 | 0 | 1 | ... | 1 |
| --- | --- | --- | --- | --- | --- | --- |

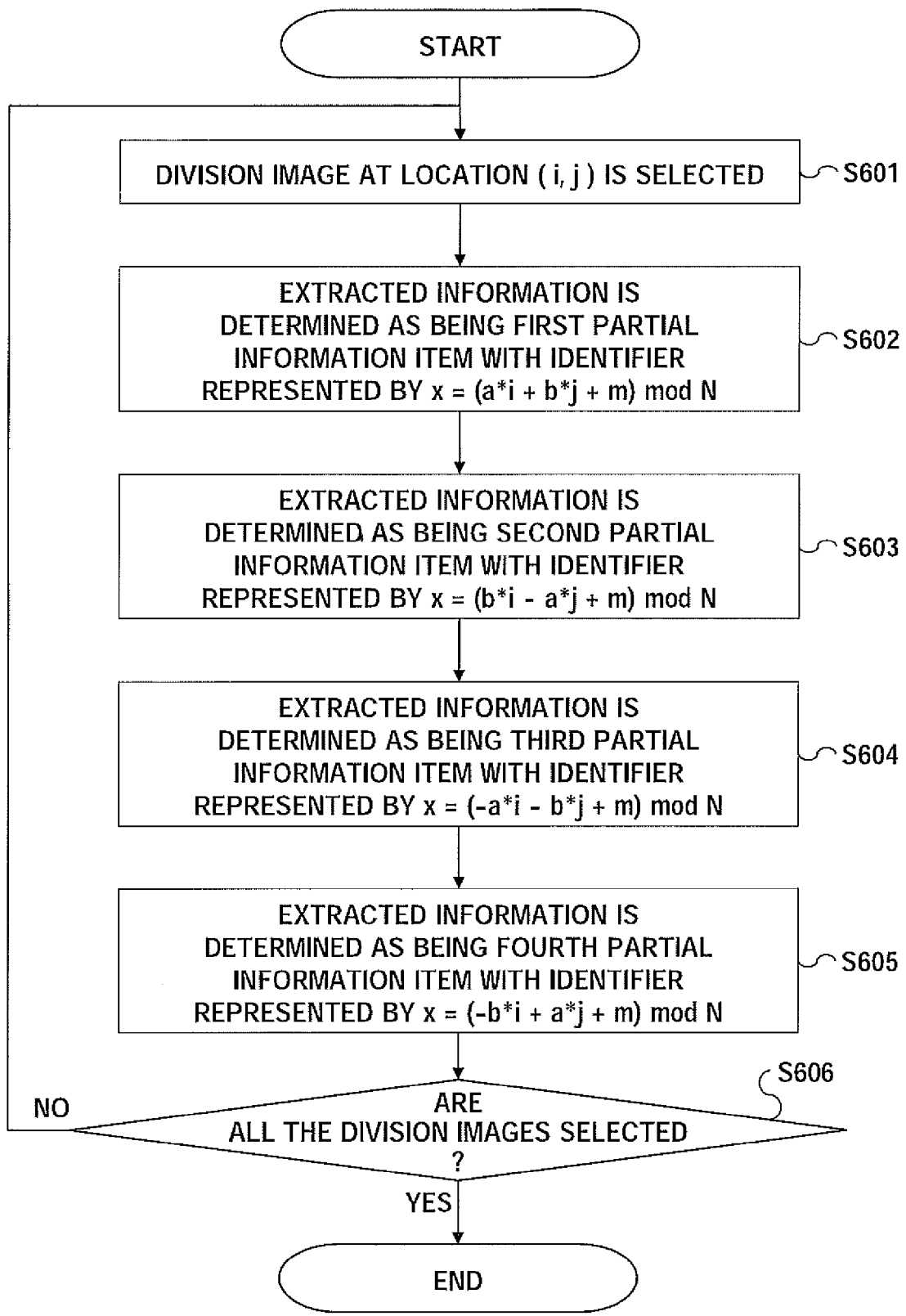

FIG.16

90 DEGREE ROTATION (COUNTERCLOCKWISE)

| 12 | 9 | 6 | 3 | 0 | 10 | 7 | 4 | 1 |
|---|---|---|---|---|---|---|---|---|
| 7 | 4 | 1 | 11 | 8 | 5 | 2 | 12 | 9 |
| 2 | 12 | 9 | 6 | 3 | 0 | 10 | 7 | 4 |
| 10 | 7 | 4 | 1 | 11 | 8 | 5 | 2 | 12 |
| 5 | 2 | 12 | 9 | 6 | 3 | 0 | 10 | 7 |
| 0 | 10 | 7 | 4 | 1 | 11 | 8 | 5 | 2 |
| 8 | 5 | 2 | 12 | 9 | 6 | 3 | 0 | 10 |
| 3 | 0 | 10 | 7 | 4 | 1 | 11 | 8 | 5 |
| 11 | 8 | 5 | 2 | 12 | 9 | 6 | 3 | 0 |

0 DEGREE ROTATION

| 11 | 3 | 8 | 0 | 5 | 10 | 2 | 7 | 12 |
|---|---|---|---|---|---|---|---|---|
| 8 | 0 | 5 | 10 | 2 | 7 | 12 | 4 | 9 |
| 5 | 10 | 2 | 7 | 12 | 4 | 9 | 1 | 6 |
| 2 | 7 | 12 | 4 | 9 | 1 | 6 | 11 | 3 |
| 12 | 4 | 9 | 1 | 6 | 11 | 3 | 8 | 0 |
| 9 | 1 | 6 | 11 | 3 | 8 | 0 | 5 | 10 |
| 6 | 11 | 3 | 8 | 0 | 5 | 10 | 2 | 7 |
| 3 | 8 | 0 | 5 | 10 | 2 | 7 | 12 | 4 |
| 0 | 5 | 10 | 2 | 7 | 12 | 4 | 9 | 1 |

FIG.17

| FIRST CANDIDATE EXTRACTED INFORMATION | 1 | 1 | 0 | 1 | ... | 0 |
| --- | --- | --- | --- | --- | --- | --- |
| SECOND CANDIDATE EXTRACTED INFORMATION | 1 | 0 | 1 | 0 | ... | 1 |
| THIRD CANDIDATE EXTRACTED INFORMATION | 1 | 1 | 1 | 0 | ... | 0 |
| FOURTH CANDIDATE EXTRACTED INFORMATION | 0 | 1 | 0 | 0 | ... | 1 |

BECAUSE IMAGE ROTATION BY 90 DEGREES IS ASSUMED,
TWO OR MORE CANDIDATE EXTRACTED INFORMATION ITEMS EXIST.
FINAL EXTRACTED INFORMATION IN THIS CASE IS DETERMINED AS FOLLOWS.

LIKELIHOOD FACTOR OF FIRST CANDIDATE EXTRACTED INFORMATION: 0.0119
LIKELIHOOD FACTOR OF SECOND CANDIDATE EXTRACTED INFORMATION: 0.0457
LIKELIHOOD FACTOR OF THIRD CANDIDATE EXTRACTED INFORMATION: 0.0119
LIKELIHOOD FACTOR OF FOURTH CANDIDATE EXTRACTED INFORMATION: 0.0457
LIKELIHOOD FACTORS ARE COMPARED: 0.0457 > 0.0119

REPEATABILITY FACTOR OF SECOND CANDIDATE EXTRACTED INFORMATION: 0.432
REPEATABILITY FACTOR OF FOURTH CANDIDATE EXTRACTED INFORMATION: 0.677
REPEATABILITY FACTORS ARE COMPARED: 0.677 > 0.432

FOURTH CANDIDATE EXTRACTED INFORMATION IS DETERMINED AS BEING FINAL EXTRACTED INFORMATION

| FINAL EXTRACTED INFORMATION | 0 | 1 | 0 | 0 | ... | 1 |
| --- | --- | --- | --- | --- | --- | --- |

INFORMATION PROCESSING DEVICE, INFORMATION EMBEDDING METHOD, AND PROGRAM

BACKGROUND OF THE INVENTION

1. Field of the Invention

This invention relates to an information processing device which has an information embedding function to embed predetermined information in an image and an embedded information extract function to extract the embedded information from the image.

2. Description of the Related Art

With development of the technology of data communication networks, such as the Internet, a technique to protect multimedia data of images, video, digital audio, etc. over data communication networks from unauthorized uses attracts attention.

Recently, research of the technique for embedding predetermined information in multimedia data by using steganography, digital watermarking, etc. is advanced for the purposes of copyright protection, data tracing, falsified data detection, meta information addition, etc. Digital watermarking is a technique to embed data in digital audio, images or video without affecting the image quality or sound quality. Steganography is a technique to write hidden messages in such a way that no one apart from the sender and intended recipient even realizes there is a hidden message. Steganography includes the concealment of digital information within computer files.

In such information embedding technique, it is important to extract the embedded information from the image data with sufficient accuracy after the predetermined information is embedded in the image data.

For example, as disclosed in Japanese Laid-Open Patent Applications No. 2000-216983, No. 2001-333267 and No. 2006-135922, a method of embedding information to a number of image regions of image data repeatedly is proposed in order to provide a method of extracting the embedded information with sufficient accuracy. Once the information is embedded in an image repeatedly, the information can be extracted from the whole image repeatedly and the extracted information items can be unified, so that the possibility that the original information is extracted correctly becomes high even when the information is partially lost or an error arises.

However, the information embedding method as disclosed in Japanese Laid-Open Patent Applications No. 2000-216983, No. 2001-333267 and No. 2006-135922 has a problem in that, although information may be easily embedded in an image region with a large optical density within an image, it is impossible to embed information in an image region with a small optical density within the image.

In a case of an image in which the applicability of information embedding varies depending on the optical density of the image (or wherein the applicable image region to which information embedding can be applied and the non-applicable image region to which information embedding cannot be applied coexist), if the repeatability cycle (alignment of the information being embedded) and the applicability cycle (alignment of the applicable image region and the non-applicable image region) are in agreement, an appearance ratio of particular parts of the embedded information (partial information items) when extracting the embedded information may decrease greatly. In such a case, a problem arises in that the extraction accuracy of the partial information items falls.

The falling of the extraction accuracy mentioned above becomes remarkable in a case of a document image in which characters, photographs, figures, etc. coexist. Generally, a document image contains many white regions, and it is difficult to embed invisible information in a white region. If particular partial information items of the invisible information are assigned to the white regions of a document image repeatedly, the repeatability cycle of the partial information items will decrease and the extraction accuracy of the partial information items will fall.

For this reason, when the image regions in which information can be embedded are restricted, it is difficult to raise the extraction accuracy of the extracted information simply by assigning information items to the image regions repeatedly and embedding the information using the information embedding method according to the related art.

SUMMARY OF THE INVENTION

In one aspect of the invention, the present disclosure provides an improved information processing device in which the above-described problems are eliminated.

In one aspect of the invention, the present disclosure provides an information processing device which is able to embed information in an image repeatedly and extract the embedded information from the image data with sufficient accuracy even when the image regions in which information can be embedded are restricted, so that all the partial information items of the embedded information are allowed to appear equally.

In an embodiment of the invention which solves or reduces one or more of the above-mentioned problems, the present disclosure provides an information processing device which embeds a number of partial information items produced from predetermined information in an image, the information processing device comprising: an image dividing unit configured to divide an image into a number of division images in a lattice formation to generate the division images; an information assigning unit configured to assign the partial information items to the division images generated by the image dividing unit; and an information embedding unit configured to embed the partial information items assigned by the information assigning unit, in the division images, wherein the information assigning unit assigns all the partial information items to a set of division images located in a predetermined direction.

In another embodiment of the invention which solves or reduces one or more of the above-mentioned problems, the present disclosure provides an information embedding method which embeds a number of partial information items produced from predetermined information in an image, the information embedding method comprising: an image dividing step of dividing an image into a number of division images in a lattice formation to generate the division images; an information assigning step of assigning the partial information items to the division images generated in the image dividing step; and an information embedding step of embedding the partial information items assigned in the information assigning unit, in the division images, wherein the information assigning step is arranged to assign all the partial information items to a set of division images located in a predetermined direction.

In still another embodiment of the invention which solves or reduces one or more of the above-mentioned problems, the present disclosure provides a computer-readable program which, when executed by a computer, causes the computer to perform an information embedding method for use in an information processing device which embeds a number of partial information items produced from predetermined information in an image, the information embedding method comprising: an image dividing step of dividing an image into a number of division images in a lattice formation to generate the division images; an information assigning step of assigning the partial information items to the division images generated in the image dividing step; and an information embedding step of embedding the partial information items assigned in the information assigning unit, in the division images, wherein the information assigning step is arranged to assign all the partial information items to a set of division images located in a predetermined direction.

According to the embodiments of the information processing device and the information embedding method of the invention, it is possible to embed information in an image repeatedly and extract the embedded information from the image data with sufficient accuracy even when the image regions in which information can be embedded are restricted, so that all the partial information items of the embedded information are allowed to appear equally.

Other objects, features and advantages of the present invention will be apparent from the following detailed description when reading in conjunction with the accompanying drawings.

BRIEF DESCRIPTION OF THE DRAWINGS

FIG. 3A is a diagram showing an example of the state where partial information items are assigned to division images in the related art.

FIG. 3B is a diagram showing an example of the state where partial information items are assigned to division images in the first embodiment of the invention.

FIG. 6 is a diagram for explaining a method of determining the extracted partial information items in the first embodiment of the invention.

FIG. 8 is a diagram showing an example of the state where partial information items are assigned to division images of two or more pages in a modification of the first embodiment of the invention.

FIG. 12 is a diagram showing an example of the state where an image having the partial information items assigned is rotated by 90 degrees in a second embodiment of the invention.

FIG. 13 is a diagram for explaining a method of determining the partial information items extracted from the image rotated by 90 degrees in the second embodiment of the invention.

FIG. 14 is a flowchart for explaining a method of determining final partial information items from the image rotated by 90 degrees in the second embodiment of the invention.

FIG. 16 is a diagram showing an example of the state where the image having the partial information items assigned is rotated by 90 degrees in a modification of the second embodiment of the invention.

FIG. 17 is a diagram for explaining a method of determining the partial information items extracted from the image rotated by 90 degrees in a modification of the second embodiment of the invention.

DETAILED DESCRIPTION OF PREFERRED EMBODIMENTS

A description will be given of embodiments of the invention with reference to the accompanying drawings.

Figure 1:
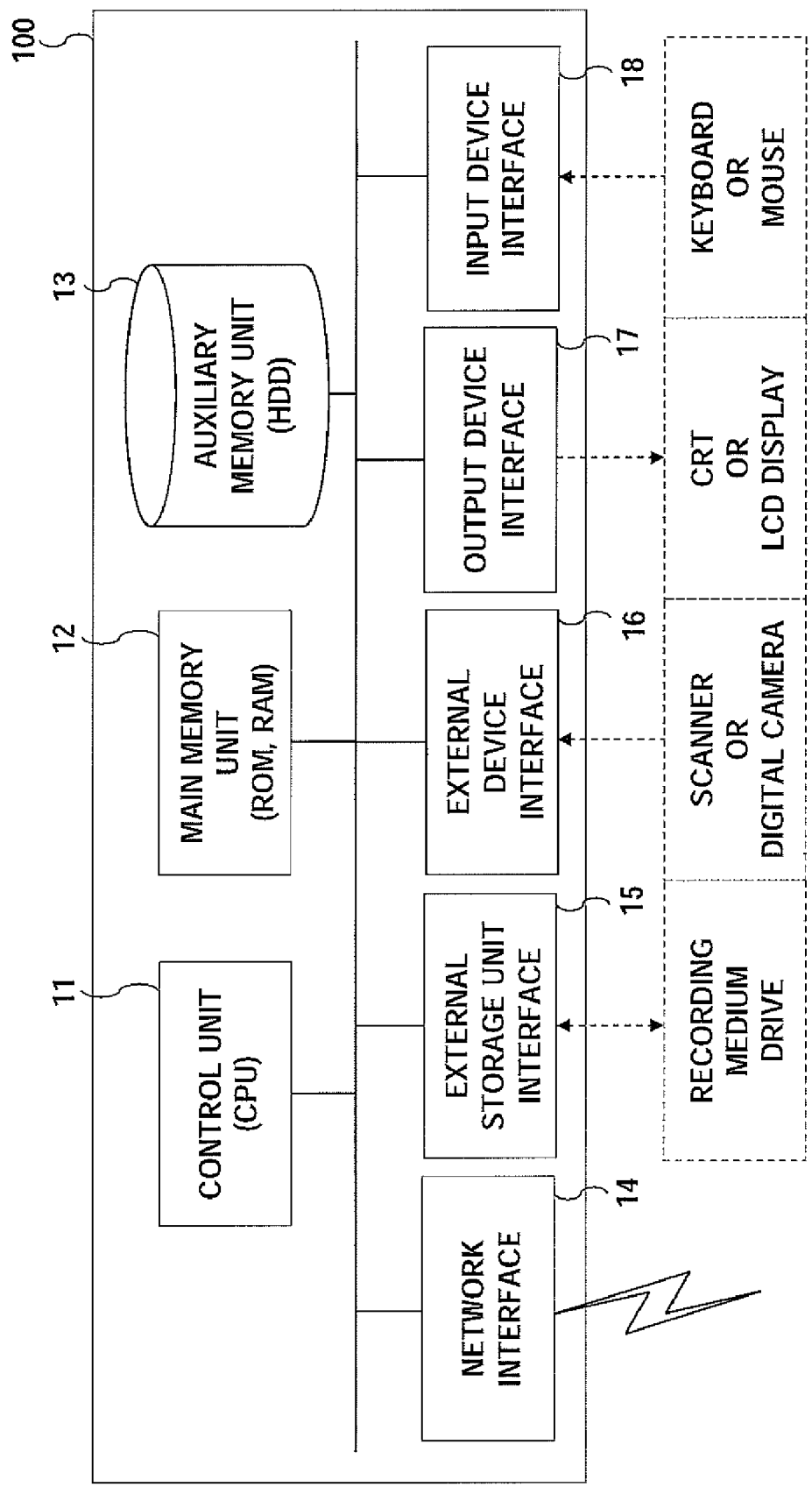
FIG. 1 is a block diagram showing the hardware composition of an information processing device in a first embodiment of the invention.

FIG. 1 shows the hardware composition of an information processing device 100 in a first embodiment of the invention. As shown in FIG. 1, the information processing device 100 of this embodiment includes a control unit 11, a main memory unit 12, an auxiliary memory unit 13, a network interface 14, an external storage interface 15, an external device interface 16, an output unit interface 17, and an input device interface 18.

The control unit (CPU) 11 controls the respective devices in the information processing device 100 of this embodiment, which include the main memory unit 12, the auxiliary memory unit 13, the network interface 14, etc.

The control unit 11 executes the program stored in the main memory unit 12 or the auxiliary memory unit 13. The control unit 11 receives data from an input unit or a storing unit, performs computations and processing of the data, and outputs the processed data to an output unit or a storing unit. For example, the control unit 11 processes the characters input from the keyboard and outputs them to the display unit.

The main memory unit (ROM, RAM) 12 is a storing device which stores the program executed by the control unit 11 and its related data (or stores them temporarily). The program executed by the control unit 11 and the related data are stored in the ROM, and the program and the related data from the ROM are loaded to the RAM by the control unit 11, if needed. Computations and processing of data are performed by the control unit 11 in accordance with the program and the related data on the RAM.

The auxiliary memory unit (HDD) 13 is a storing device which stores the OS (operating system) and the application programs, including the information processing program of this embodiment and the plug-in software for function expansion, together with the related data. Also, in the auxiliary memory unit 13, various kinds of information (for example, definition information which defines the executing conditions and executing sequence of the plug-in software) are stored, and the executing conditions executing sequence is managed by the information processing device 100 of this embodiment with a database, a file system, etc.

The network interface 14 is an interface of the information processing device 100 of this embodiment to a peripheral device (for example, another information processing device, an image forming device, etc.) having a communication function and connected via a network, such as LAN (local area network) or WAN (wide area network), which is constructed with wired or wireless data transmission line.

The external storage interface 15 is an interface of the information processing device 100 of this embodiment to an external storage (for example, a memory medium drive, etc.) connected via a data transmission line, such as a USB (universal serial bus).

The external device interface 16 is an interface of the information processing device 100 of this embodiment to an external input device (for example, an external HDD, a USB memory, etc.) connected via a data transmission line, such as a USB.

The information processing device 100 of this embodiment performs data exchange (transmitting/receiving or reading/writing) of various data with the external devices via these interfaces.

The output unit interface 17 is an interface of the information processing device 100 of this embodiment to an output unit (for example, a CRT display, a LCD display, etc.) connected via a data transmission line, such as a dedicated cable.

The input device interface 18 is an interface of the information processing device 100 of this embodiment to an input device (for example, a keyboard, a mouse, etc.) connected via data transmission lines, such as a USB.

Figure 2:
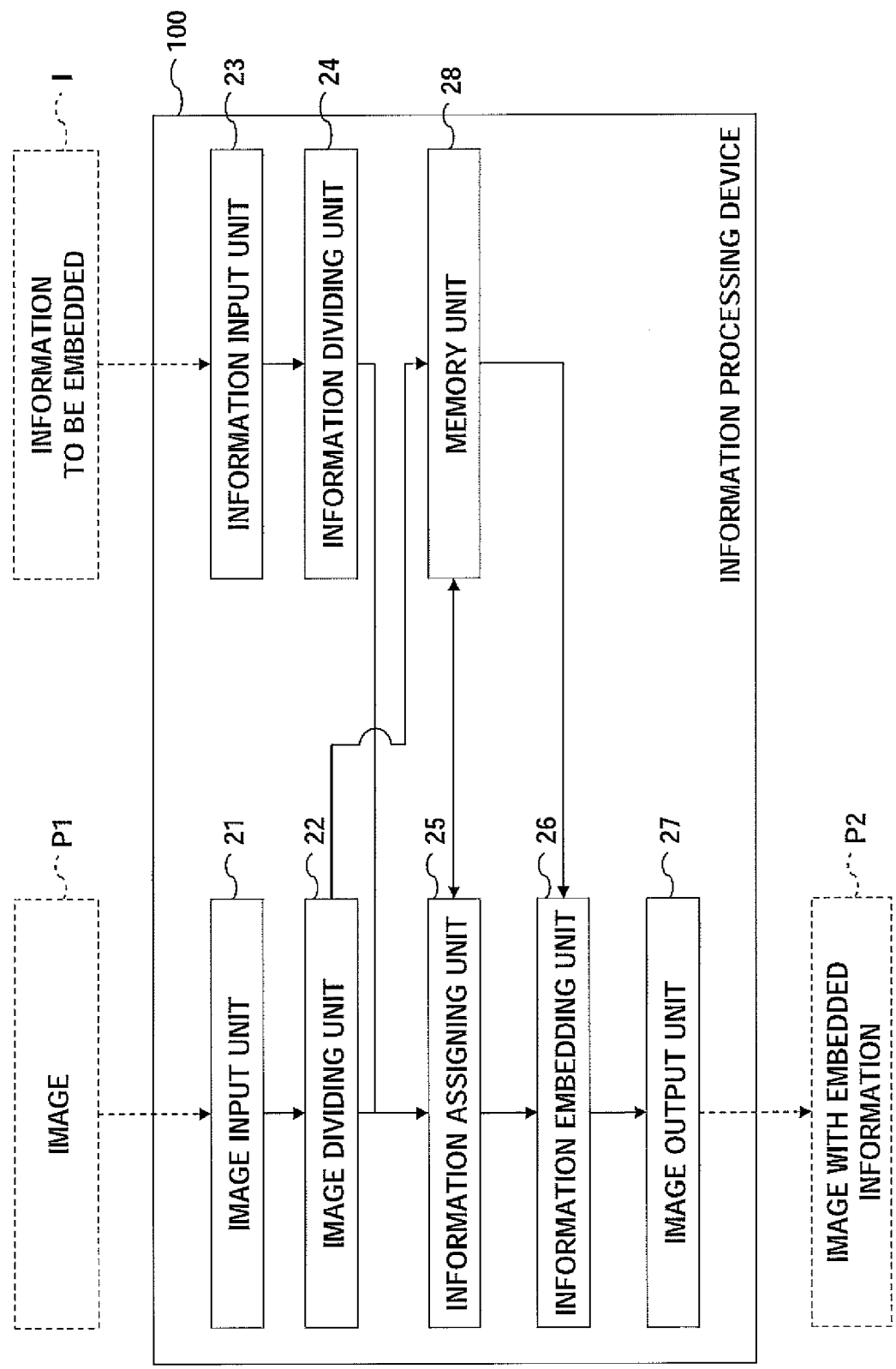
FIG. 2 is a block diagram showing the functional composition of the information embedding function in the first embodiment of the invention.

FIG. 2 shows the functional composition of the information embedding function in the information processing device 100 of the first embodiment of the invention.

As shown in FIG. 2, the information embedding function of this embodiment includes an image input unit 21, an image dividing unit 22, an information input unit 23, an information dividing unit 24, an information assigning unit 25, an information embedding unit 26, an image output unit 27, and a memory unit 28.

The image input unit 21 provides the function of inputting into the information processing device 100 an image P1 read by the image reader, such as a scanner, which is, for example, connected to the information processing device 100 of this embodiment via the external device interface 16.

The image dividing unit 22 provides the function of dividing the image P1 input by the image input unit 21 into a number of image regions in a lattice formation (a number of division images are generated). The image dividing unit 22 stores the division images with their unique identifiers in the memory unit 28.

The information input unit 23 provides the function of inputting into the information processing device 100 information I to be embedded stored in the external memory, such as a memory-medium drive, which is, for example, connected to the information processing device 100 of this embodiment via the external memory interface 15.

The information dividing unit 24 provides the function of dividing the information I input by the information input unit 23; into a number of information items (a number of partial information items are generated).

The information assigning unit 25 provides the function of assigning the partial information items, which are generated by the information dividing unit 24, to the division images produced by the image dividing unit 22, and the partial information items are associated with the division images.

The information assigning unit 25 may be arranged so that all the partial information items of information I to be embedded are assigned to division images which constitute the respective rows and/or columns of the image P1. That is, all the partial information items of information I to be embedded are assigned by the information assigning unit 25 so that all the partial information items of information I may appear equally in the rows and/or columns of the image P1.

Alternatively, the information assigning unit 25 may be arranged so that all the partial information items of information I to be embedded are assigned to a number of continuous division images which constitute respective rows and columns of the image P1, and all the partial information items of information I to be embedded may appear only in the fewest possible image regions (i.e., in the smallest possible number of division images).

The information embedding unit 26 provides the function of embedding the assigned partial information items in the division images in accordance with the associations of the division images and the partial information items produced by the information assigning unit 25. For example, DCT (discrete cosine transform) is used by the information embedding unit 26 to embed the partial information items in the division images. By the function of the information embedding unit 26, all the partial information items of information I are embedded in division images for every partial information item, and the partial information items are repeatedly embedded in the division images among the division images produced by the image dividing unit 22, corresponding to image regions of the original image in which information can be embedded (for example, image regions with a large optical density).

The image output unit 27 provides the function of outputting the image P2 in which the information I is embedded by the information embedding unit 26, to the output unit, such as a printer, which is, for example, connected to the network to which the information processing device 100 of this embodiment is connected via the network interface 14.

FIG. 3A shows an example of the state where partial information items are assigned to division images in the related art. FIG. 3B shows an example of the state where partial information items are assigned to division images in the first embodiment of the invention.

The image dividing unit 22 is configured to divide the input image P1 into a number of image regions (a number of division images are generated). For example, the image dividing unit 22 divides the input image P1 into 64 (8×8) image regions in the rectangular lattice formation shown in FIG. 3B.

The size and form of the division images which are produced by the image dividing unit 22 are not restricted in performing the information embedding function of this embodiment. The size or the form may differ for every division image. The division images of the rectangular lattice formation shown in FIG. 3B are an example of the size and form of division images which are produced by the image dividing unit 22.

However, in order to perform the information embedding function of this embodiment, the image dividing unit 22 must be arranged to divide the input image into the image regions the number of which is larger than the number of partial information items which are produced by dividing the information I to be embedded. Namely, in the example of FIG. 3B, the number of partial information items produced by dividing the information I to be embedded is eight, and the input image P1 must be divided into eight or more image regions.

The information dividing unit 24 is configured to divide the input information I into a number of partial information items (the number of partial information items are generated). For example, in the example of FIG. 3B, the amount of the information I to be embedded is 8 bits, and the information I is divided into eight partial information items, each with 1 bit of information.

The number of partitions of information I to be embedded, and the amount of information of each of partial information items produced by dividing the information I are not restricted in performing the information embedding function of this embodiment. The information I may be divided into an arbitrary number of partial information items, and the amount of information of each of the partial information items produced may differ for every partial information item.

However, in order to perform the information embedding function of this embodiment, the information dividing unit 24 must be arranged to divide the input information I into division images, the number of which is smaller than the number of the division images produced by dividing the input image P1.

The information assigning unit 25 is configured to assign the partial information items produced by the information dividing unit 24, to the division images which are produced by the image dividing unit 22.

Specifically, the information assigning unit 25 is arranged so that, with respect to a division image produced by the image dividing unit 22 and located at the two-dimensional space coordinates (i, j) corresponding to one of the rows and columns of the image P1, a partial information item which is determined based on a value of a remainder obtained when a computation value x of the following formula (1) is divided by the number N of the partial information items produced by the information dividing unit 24, is assigned:

$$x = (axi + bxj + m) \bmod N \quad (1)$$

where a, b, and m are predetermined integers, the number N of the partial information items and the predetermined integer a are relatively prime, and the number N of the partial information items and the predetermined integer b are relatively prime.

The "mod" in the formula (1) is an operator indicating a value of a remainder obtained by the division. In the case of "Z=X mod Y", Z is a value of the remainder obtained when X is divided by Y.

The predetermined integers a and b must meet the following conditions (1) and (2).
Condition (1):
The number N of the partial information items of the information I and the predetermined integer a are relatively prime, and the number N of the partial information items of the information I and the predetermined integer b are relatively prime. The expression "relatively prime" herein means that the largest common factor of the number N of the partial information items of the information I and the predetermined integer a or b is set to 1.
Condition (2):
The integer i or j of the coordinate value (i, j) of the division image is set to an integer nearest to a square root of the number N of the partial information items of the information I, and one of the following formula (2) or (3) is satisfied:

$$axi = b \pmod{N} \quad (2)$$

$$a = bxj \pmod{N} \quad (3)$$

The predetermined integer m in the formula (1) has a role of key information, and a role of enhancing the difficulty in algorithm estimation. The role of key information means that information extraction cannot be performed if the value of m used for information embedding is not known. The role of enhancing the difficulty in algorithm estimation means to make decoding of the embedded information by the algorithm difficult.

If all the values of a, b, m, and N are fixed and different information is embedded in the same image, the hint of the information embedding algorithm will be created by taking the difference of the image (if the algorithm is known, forgery and alteration will be possible).

To eliminate the problem, the integer m is changed at random when embedding information, and the difference of the image is made large by a 1-bit difference, and the difference image is changed each time. This makes decoding of the algorithm difficult.

In this case, the value of m will not be known to one who performs the authorized information extraction. However, the code for synchronization is separately embedded, (for example, 3 bits at the head end of the embedded information are set to '101', and the coding is performed so that these bits may not appear in other portions), and the embedded information can be extracted even if the value of m is not known.

The information assigning unit 25 is arranged to use the formula (1), in which the values of the above-mentioned integers a, b, m, and the number N of the partial information items of the information I which meet the conditions (1) and (2) are substituted, and compute the identifier x of the partial information item being assigned to the division image (where x denotes an integer ranging from 0 to N−1) based on the coordinate value (i, j) of the division image. The identifier x indicates one of the 0th to (N−1)th partial information items produced by dividing the information I, where N denotes the number of partitions of the information I to be embedded.

FIG. 3A shows an example of the information assigning state where the partial information items are assigned to the division images located in two-dimensional space of eight rows and eight columns in the related art.

As shown in FIG. 3A, according to the related art, the 0th to 7th partial information items, produced by dividing the information I, are assigned in order to the eight division images in the row direction, and the partial information items are repeatedly embedded in the division image 8 times for each row.

Suppose that the division images to which the 5th to 7th partial information items in the example of FIG. 3A are assigned are image regions with a small optical density where information cannot be easily embedded (or white regions). In such a case, even if the 0th to 4th partial information items can be easily embedded in other division images, the 5th to 7th partial information items cannot be easily embedded in such division images. As a result, the appearance ratio of the partial information items is decreased greatly, and the extraction accuracy of the 5th to 7th partial information items will fall.

To eliminate the problem, the information assigning unit 25 of this embodiment is arranged to assign all the partial information items to continuous division images which are produced by the image dividing unit 22 and constitute respective rows and columns of the image P1. All the partial information items of the information I are assigned uniformly (the alignment of partial information items being assigned differs in respective rows and columns), and it is possible to extract the embedded information I with sufficient accuracy from the image P2 in which the partial information items are embedded repeatedly, because all the partial information items of the information I appear equally even in the image P1 in which the division images where the information I can be easily embedded are restricted.

The example of the state of information assignment shown in FIG. 3B is provided by the information assigning unit 25 of this embodiment such that the integers a, b, and m, which meet the conditions (1) and (2) based on the number N (=8) of the partial information items of the information I that consists of 8 bits of information, are set to a=7, b=5, and m=0, the formula (1) used in the information assigning unit 25 is set to "x=(7i+5j)mod 8", and the partial information items are assigned to the division images located in two-dimensional space of eight rows and eight columns.

As is apparent from FIG. 3B, the information assigning unit 25 computes the identifier x of the partial information item (x: an integral ranging from 0 to 7) assigned to the division image located at the two-dimensional space coordinates (i, j), by using the formula (1) "x=(7i+5j)mod 8" based on the coordinate value (i, j) of the division image. As a result, the information assigning unit 25 assigns all the 0th to 7th partial information items of the information I based on the computed identifier x, to continuous division images which constitute the row and columns of the image.

Specifically, in the example of FIG. 3B, the 0th partial information item (0=(7×0+5×0)mod 8) is assigned to the division image located at (0, 0), the 5th partial information item (5=(7×0+5×1)mod 8) is assigned to the division image located at (0, 1), the 2nd partial information item (2=(7×0+5×2)mod 8) is assigned, and all the 0th to 7th partial information items appear equally in the division images at the locations (0, 0) to (0, 7) in order of the 0th, the 5th, the 2nd, the 7th, the 4th, the 1st, the 6th, and the 3rd.

Similarly, in the example of FIG. 3B, the 7th partial information item (7=(7×1+5×0)mod 8) is assigned to the division image located at (1, 0), the 6th partial information item (6=(7×2+5×0)mod 8) is assigned to the division image located at (2, 0), and all the 0th to 7th partial information items appear equally in the division images at the locations (0, 0) to (7, 0) in order of the 0th, the 7th, the 6th, the 5th, the 4th, the 3rd, the 2nd, and the 1st.

That is, the information assigning unit 25 is arranged to assign the partial information item, specified from among all the partial information items of the information I based on the computed identifier x, to the division image. As a result, each time the 0th to 7th partial information items are embedded in the image repeatedly, the alignment of the 0th to 7th partial information items assigned to the continuous division images which constitute the rows and columns of the image differs, and all the partial information items of the information I are assigned uniformly.

The information assigning unit 25 in this case assigns the partial information items to the division images by using the formula (1) which satisfies the condition (1), and all the partial information items of the information I can be assigned equally, and the extraction accuracy of each partial information item can be improved. In many cases, a document image contains characters, figures, and photographs continuously arranged horizontally or vertically, and assigning all the 0th to (N−1)th partial information items of the information I to continuous division images which constitute the rows and columns of the image is effective for improving the extraction accuracy.

Moreover, as is apparent from the information assigning state of FIG. 3B, the information assigning unit 25 may be arranged so that the coordinate value i or the coordinate value j of the division image is set to an integer (=3) that is nearest to a square root (≈2.82) of the number N (=8) of the partial information items of the information I, and when the integers a, b, and N meet the formula (2) "7i=5(mod)8" or the formula (3) "7=5j(mod)8", all the 0th to 7th partial information items of the information I are assigned to "y" division images wherein y is computed in accordance with "y=i×ceil(N/i)" or "y=j×ceil(N/j)".

The ceil(Z) mentioned above is a function which outputs the minimum integer that is larger than Z. For example, all the 0th to 7th partial information items of the information I are assigned to 9 division images (9=3×ceil(8/3)) at the locations (0, 0), (1, 0), (2, 0), (0, 1), (1, 1), (2, 1), (0, 2), (1, 2), and (2, 2). Alternatively, all the 0th to 7th partial information items of the information I are assigned to 9 division images at the locations (5, 5), (6, 5), (7, 5), (5, 6), (6, 6), (7, 6), (5, 7), (6, 7), and (7, 7).

The information assigning unit 25 in this case assigns the partial information items to the division images by using the formula (1) which satisfies the condition (2), and all the 0 th to (N−1)th partial information items may be assigned to the fewest possible image regions (i.e., the smallest possible number of division images).

Therefore, the information assigning unit 25 can assign all the partial information items of the information I equally in the image regions which are restricted, and the extraction accuracy of each partial information item can be improved. In many cases, a document image contains white regions where it is difficult to embed information, and assigning all the 0th to (N−1)th partial information items of the information I to the fewest possible image regions (i.e., the smallest possible number of division images) is effective for improving the extraction accuracy.

The memory unit 28 stores the associations of the partial information items and the division images in which the partial information items (produced by the information dividing unit 24) are assigned to the division images (produced by the image dividing unit 22) by the information assigning unit 25.

Specifically, the memory unit 28 is the RAM of the main memory unit 12 or the auxiliary memory unit 13, and associations of the positions (i, j) of the division images in two-dimensional space coordinates and the identifiers x of the partial information items assigned thereto (x: an integer ranging from 0 to N−1) are stored in the memory unit 28.

The information embedding unit 26 is configured to embed the partial information items in the corresponding division images in accordance with the associations of the partial information items and the division images which are stored in the memory unit 28.

It is preferred that the information embedding method of the information embedding unit 26 can embed the information I in the image regions in which removing the embedded information I is difficult and degradation of the quality of image can be suppressed. For this purpose, the data of the image P1 is transformed into frequency components and the information I is embedded in specific frequency components. The frequency transformation is performed using any of DCT (discrete cosine transform), FFT (fast Fourier transform), wavelet transform, etc.

The information embedding method is not restricted when realizing the information embedding function of this embodiment, and any method may be used. An example of the information embedding method of the information embedding unit 26 of this embodiment which uses DCT and embeds bit '0' or bit '1' of the partial information items in the division images will be explained.

The information embedding unit 26 measures the distribution of the intensity values of picture elements in a division image. When the result of the measurement (variance) is smaller than a specific threshold value, the information embedding unit 26 does not embed the assigned partial information items in the division image.

On the other hand, when the result of the measurement (variance) is larger than the specific threshold value, the information embedding unit 26 performs the DCT of the division image (frequency transformation). For example, when bit '0' of the partial information item is embedded a specific coefficient is set to +d, and when bit '1' of the partial information item is embedded, the specific coefficient is changed to −d. After the specific coefficient is changed, the information embedding unit 26 performs the inverse DCT (inverse transformation) of the frequency component so that the division image containing the embedded information is reconstructed. In this manner, the information embedding unit 26 performs the above procedure for all the division images of the image P1 repeatedly.

In the example of FIG. 3B, the image P1 is divided into 64 (8×8) individual division images and the division images with the embedded information are generated. In this case, the information embedding unit 26 repeats performing the above procedure to embed one of the partial information items in the corresponding division image 64 times.

The information processing device 100 of this embodiment performs the following steps to realize the information embedding function.

(Step 1) Division of Image P1 and Information I

The image dividing unit 22 is caused to divide the input image P1 into a number of image regions so that division images are generated. The information dividing unit 24 is caused to divide the input information I into a number of information items so that partial information items are generated.

(Step 2) Assignment of Partial Information Items

The information assigning unit 25 is caused to assign the x-th partial information item (x=(axi+bxj+m)mod N) to the division image located at the two-dimensional space coordinates (i, j) in the image P1, and store the association of the division image and the partial information item in the memory unit 28.

(Step 3) Embedding of Partial Information Items

The information embedding unit 26 is caused to embed each assigned partial information item in the corresponding division image in accordance with the associations of the division images and the partial information items stored in the memory unit 28, by using the information embedding method, such as the DCT.

By the above-described information embedding function, the information processing device 100 of this embodiment is able to embed the information I in an image repeatedly so that all the partial information items of the information I may appear equally even if the image regions in which the information I can be embedded are restricted.

In the information processing device 100 of this embodiment, the information assigning unit 25 uses the formula (1) "x=(axi+bxj+m)mod N" in which the respective values of the integers a, b, and m, meeting the conditions (1) and (2), and the number N of the partial information items of the information I are substituted, and computes the identifier x (x: an integer ranging from 0 to (N−1)) of the partial information item assigned to the division image based on the coordinate value (i, j) of the division image.

Subsequently, the information assigning unit 25 stores the association of the position (i, j) of the division image and the identifier x of the assigned partial information item into the memory unit 28 (or the RAM of the main memory unit 12 or the auxiliary memory unit 13).

Figure 4:
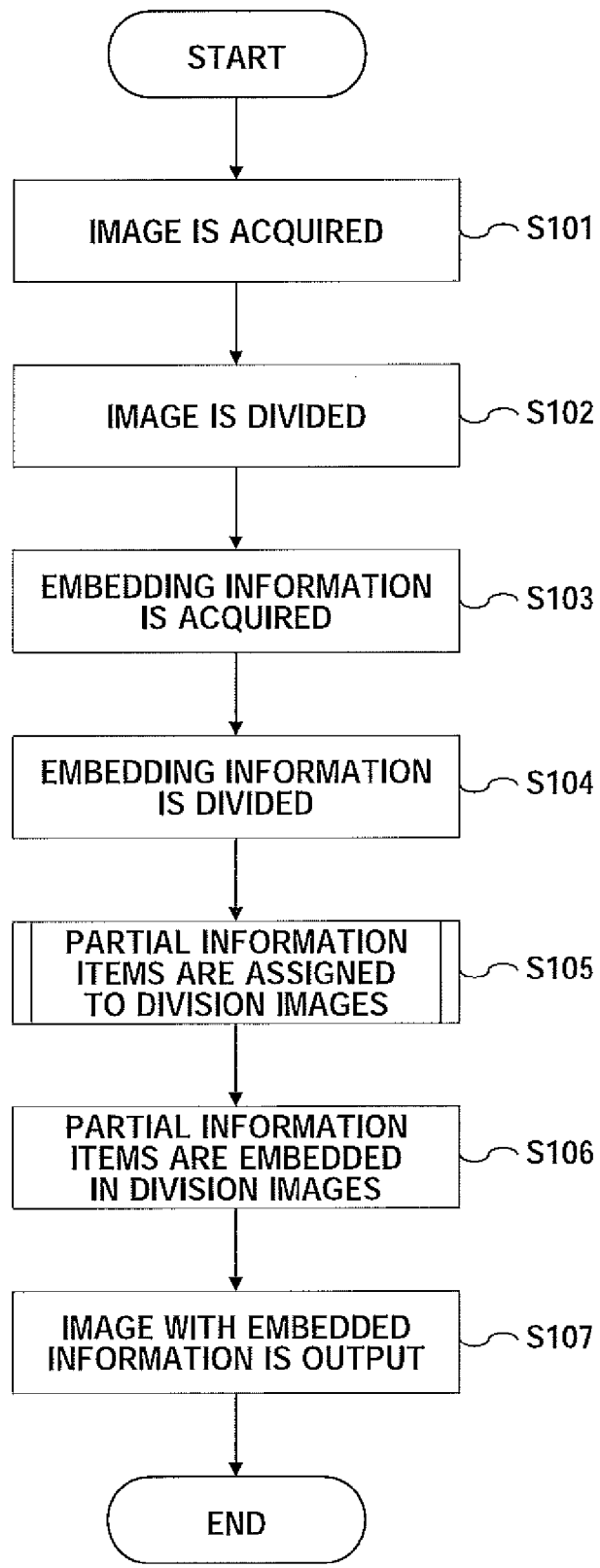
FIG. 4 is a flowchart for explaining the procedure of the information embedding function in the first embodiment of the invention.

FIG. 4 is a flowchart for explaining the operation of the information embedding function in the information processing device 100 of the first embodiment of the invention.

The information processing device 100 of this embodiment loads the information embedding processing program from the auxiliary memory unit 13 to the RAN of the main memory unit 12 and causes the control unit 11 to execute the program.

As shown in FIG. 4, the information embedding function of this embodiment causes the image input unit 21 to input (or acquire) an image P1 (S101), and causes the image dividing unit 22 to divide the input image P1 into a number of division images (S102).

The information embedding function causes the information input unit 23 to input (or acquire) the information I (S103), and causes the information dividing unit 24 to divide the input information I into a number of partial information items (S104).

The information embedding function causes the information assigning unit 25 to assign all the partial information items of the information I to the division images which constitute respective rows and respective columns of the image P1 (S105).

The information embedding function causes the information embedding unit 26 to transform the data of the image P1 into frequency components by the DCT, to perform the processing which embeds the information in specific frequency components, and to embed the assigned partial information items to the division images respectively (S106). At this time, all the partial information items of information I are repeatedly embedded in the respective rows and columns of the image P1 in which information can be easily embedded.

Finally, the information embedding function causes the image output unit 27 to output the image P2 with the embedded information I (S107).

The information embedding function of this embodiment is constituted by the respective units shown in FIG. 2, and the operation shown in FIG. 4 is performed by the control unit 11 in the information processing device 100 of this embodiment so that the function which embeds the information I in the image P1 repeatedly is performed.

Next, the composition of the embedded information extract function in the information processing device 100 of this embodiment of FIG. 1 to extract the embedded information I from the image P2 with the embedded information I will be explained with reference to FIG. 5.

Figure 5:
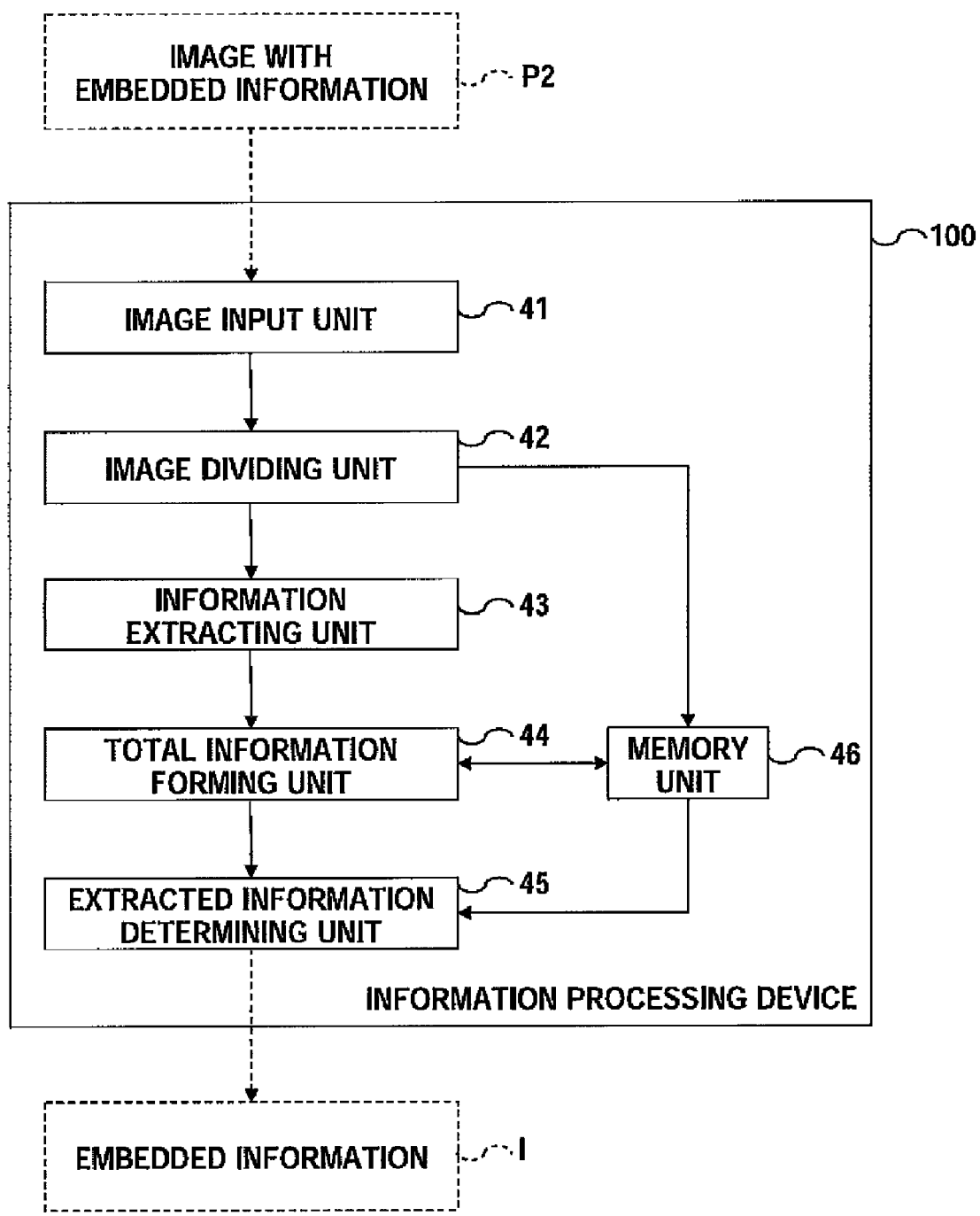
FIG. 5 is a block diagram showing the functional composition of the embedded information extract function in the first embodiment of the invention.

FIG. 5 shows the functional composition of the embedded information extract function in the first embodiment of the invention.

As shown in FIG. 5, the embedded information extract function of this embodiment includes an image input unit 41, an image dividing unit 42, an information extracting unit 43, a total information forming unit 44, an extracted information determining unit 45, and a memory unit 46.

The image input unit 41 provides the function to input, into the information processing device 100, an image P2 in which information I is embedded read by the image reader, such as a scanner, connected to the information processing device 100 of this embodiment via the external device interface 16.

The image dividing unit 42 provides the function to divide the image P2 input by the image input unit 41 into a number of image regions (a number of division images are generated). The image dividing unit 42 stores the division images with their region identifiers in the memory unit 46. Moreover, the mage dividing unit 42 stores the number of the division images in the memory unit 46.

The information extracting unit 43 provides the function to extract the partial information items of the information I embedded by the information embedding function, from the division images which are generated by the image dividing unit 42.

For example, when the information I is embedded by the information embedding function by performing the DCT and embedding the partial information items in the division images, the information extracting unit 43 uses the DCT that is the same as the embedding method to extract the partial information items from the division images.

The total information forming unit 44 provides the function to compute the identifiers of the partial information items extracted by the information extracting unit 43, classify the repeatedly extracted partial information items according to each computed identifier, and determine the candidate information group for determining final partial information items. The information I is embedded in the image P2 repeatedly, and the information items, each serving as a candidate of partial information items, exist for the same identifier. The final partial information items are determined from the candidate information group.

In the total information forming unit 44, the identifier of the extracted partial information item is computed based on the position (i, j) of the division image in the two-dimensional space coordinates, by using the formula 1 used by the information embedding function at the time of assigning the partial information items to the division images.

The extracted information determining unit 45 provides the function of determining the final partial information items based on the likelihood factor computed for every content of information among the candidate information group determined by the total information forming unit 44, and of determining the final extracted information (i.e. the information embedded in the image P2) based on the result of the final partial information items.

In the information extracting unit 43, the likelihood of the partial information items (the probability that the partial information items will appear) extracted based on the distances of ±d from the specific DCT coefficients and the same identifier are computed, and the extracted information determining unit 45 determines the computed results as being the likelihood of the partial information items.

When the likelihood is considered as the likelihood factor, the extracted information determining unit 45 determines the partial information items for every identifier based on the computed likelihood factor by using the maximum likelihood estimate method, and determines the final extracted information.

Figure 7:
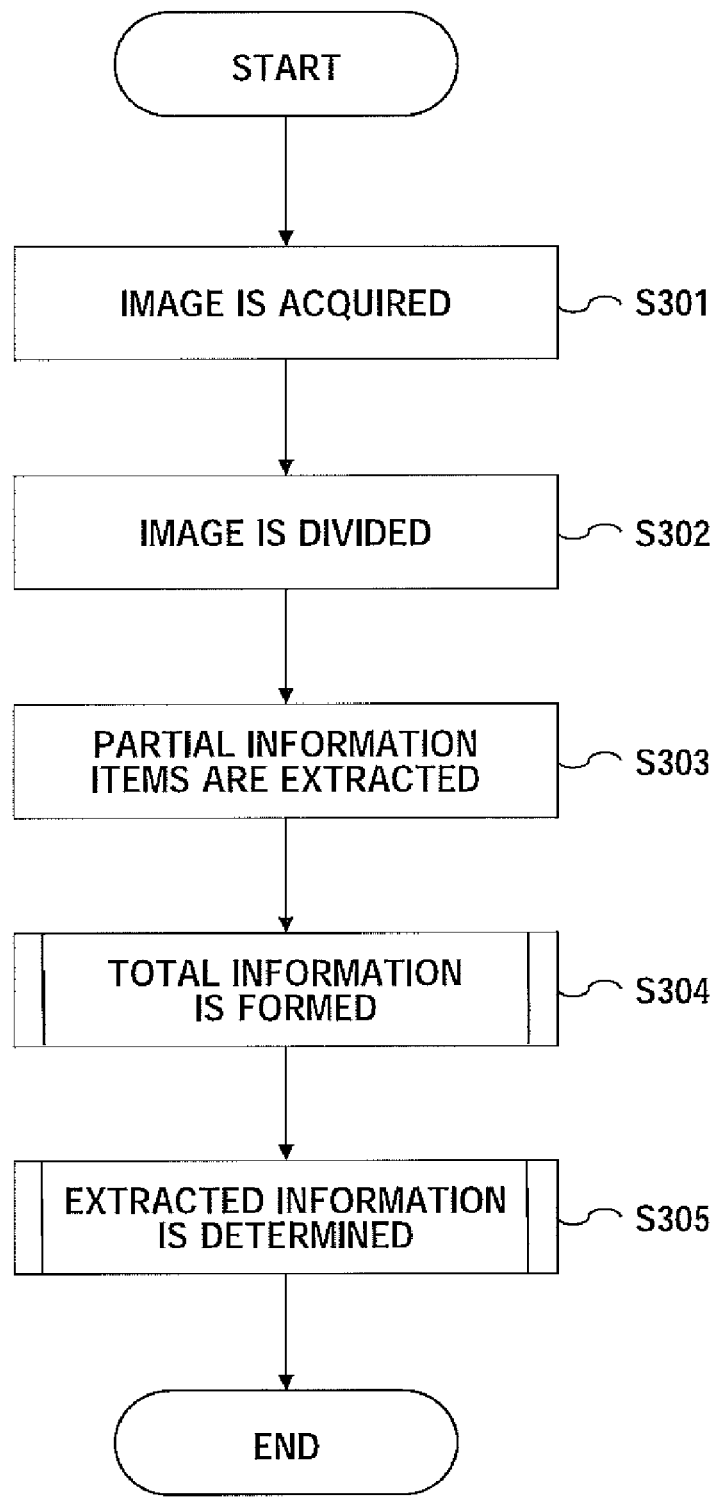
FIG. 7 is a flowchart for explaining the procedure of the embedded information extract function in the first embodiment of the invention.

The embedded information extract function of this embodiment is constituted by the functional composition shown in FIG. 5, and to realize the function to extract the embedded information I from the image P2 in which the information I is embedded repeatedly, the control unit 11 of the information processing device 100 of this embodiment is caused to perform the procedure shown in FIG. 7.

FIG. 6 is a diagram for explaining a method of determining the extracted partial information items in the first embodiment of the invention.

The image dividing unit 42 is configured to divide the input image P2 into a number of image regions (a number of division images are generated).

In the image dividing unit 42, the image P2 is divided in accordance with the number N of the partial information items and the size and form of the division images which are the same at the time of dividing the input image P1 by the information embedding function.

The partial information extracting unit 43 is configured to extract the partial information items of the information I, embedded by the information embedding function, from the division images which are produced by the image dividing unit 42.

For example, the embedded information extraction method in the partial information extracting unit 43 uses the DCT for information extraction which is the same as that of the information embedding method of the information embedding function when embedding the information I in the division images. Supposing the DCT is performed as an example of the embedded information extraction method used by the partial information extracting unit 43, the method of extracting information from the division images in which bit '0' or bit '1' of partial information items are embedded will be explained.

The partial information extracting unit 43 performs the DCT of a division image (frequency transformation). When the specific DCT coefficient is adequately near +d, the partial information extracting unit 43 extracts the partial information item consisting of bit '0', and when the specific DCT coefficient is adequately near −d, the partial information extracting unit 43 extracts the partial information item consisting of bit '1'. The partial information extracting unit 43 performs such a procedure for all the division images which are produced from the input image P2.

The extracted information generating unit 45 is configured to generate the embedded information I in the image P2 based on the partial information items extracted by the partial information extracting unit 43.

The extracted information generating unit 45 uses the formula 1: "x=(axi+bxj+m)mod N" at the time of assigning the partial information items to the division images by the information embedding function, and computes the identifier x of each partial information item extracted by the partial information extracting unit 43 based on the position (i, j) of the division image in the two-dimensional space coordinates.

Next, the extracted information generating unit 45 classifies the repeatedly extracted partial information items according to each computed identifier and generates candidate information group for determining final partial information items. Because the information I is embedded in the image P2 repeatedly, two or more information items each serving as a candidate of the partial information items may exist for the same identifier. Thus, the final partial information items are determined from the candidate information group.

Suppose that the information I is divided into N items and the partial information items extracted from the division images located at the coordinate value (i, j) are the partial information items of the identifier x computed according to the formula (1). As shown in FIG. 6, the extracted partial information items are classified according to each identifier (#0-#N−1), and the whole information extracted from the image P2 (the extracted information group) is constituted.

The extracted information generating unit 45 computes, when the partial information items are extracted by the partial information extracting unit 43, a distance of the specific DCT coefficient from ±d and a likelihood factor of each extracted information item with the same identifier (the likelihood factor indicating the probability that the partial information item appears), and determines the final partial information items from the candidates of the partial information items based on the computed likelihood factors.

Supposing that the likelihood factors of the partial information items extracted with the same identifier are the likelihood factors of the partial information items, with respect to the identifier #0 of the partial information items in the example of FIG. 6, the likelihood factor of the partial information item extracted for the first time as being bit '0' is 0.8, the likelihood factor of the partial information item extracted for the 2nd time as being bit '0' is 0.7, the likelihood factor of the partial information item extracted for the 3rd time as being bit '0' is (1−0.6), and the likelihood factor of the partial information item extracted for the 4th time as being bit '0' is (1−0.7).

Moreover, the likelihood factor of the partial information item extracted with the identifier #0 for the first time as being bit '1' is (1−0.8), the likelihood factor of the partial information item extracted with the identifier #0 for the 2nd time as being bit '1' is (1−0.7), the likelihood factor of the partial information item extracted with the identifier #0 for the 3rd time as being bit '1' is 0.6, and the likelihood factor of the partial information item extracted with the identifier #0 for the 4th time as being bit '1' is 0.7.

Therefore, the extracted information generating unit 45 computes the product of the likelihood factors of the extracted partial information items corresponding to the number of times of extraction for each of bit '0' case and bit '1' case, and compares the multiplication results between bit '0' case and bit '1' case. As a result, the extracted information generating unit 45 determines the extracted partial information item with the larger multiplication result as being the final partial information item (maximum likelihood estimate method).

Specifically, in the case of the partial information item identifier #0 in the example of FIG. 6, the multiplication result of the likelihood factors of bit '0' case is set to 0.0672 (=0.8× 0.7×(1−0.6)×(1−0.7)), and the multiplication result of the likelihood factors of bit '1' case is set to 0.0252 (=(1−0.8)× (1−0.7)×0.6×0.7). Therefore, because the multiplication result of bit '0' case is larger than that of bit '1' case (0.0672>0.0252), the final extracted information item for the extracted partial information item with the identifier #0 is determined as being bit '0'.

In this manner, the final extracted partial information items for every identifier are determined based on the likelihood factors of the extracted information items, and the extracted information generating unit 45 generates the final extracted information (i.e., the information I embedded in the image P2) as in the example of FIG. 6.

As described above, the information processing device 100 of this embodiment performs the following steps to realize the embedded information extract function.

(Step 1) Division of Image P2

The image dividing unit 42 is caused to divide the input image P2 into a number of image regions, so that a number of division images are generated.

(Step 2) Extraction of Partial Information Items

The partial information extracting unit 43 is caused to extract the partial information items of the embedded information from the division images, by using the embedded information extraction method such as the DCT. When the partial information items are extracted by the partial information extracting unit 43, the extracted information generating unit 45 is caused to compute the distance of the specific DCT coefficient from ±d and the likelihood factor of each extracted information item with the same identifier.

(Step 3) Generation of Extracted Information
(Step 3-1) Determination of Partial Information Items The extracted information generating unit 45 is caused to use the formula (1) "x=(axi+bxj+m)mod N" which is used when assigning the partial information items to the division images by the information embedding function, and to compute the identifier x of each partial information item extracted by the partial information extracting unit 43 based on the position (i, j) of the division image in the two-dimensional space coordinates.

Next, the extracted information generating unit 45 is caused to classify the repeatedly extracted partial information items according to each computed identifier, and to generate the information group which represents candidates for determining final partial information items. As a result, the extracted information generating unit 45 is caused to determine the final partial information items from the candidates of the partial information items based on the computed likelihood factors of the extracted information.

(Step 3-2) Generation of Extracted Information

The extracted information generating unit 45 is caused to determine the final partial information items for every identifier, and to generate the final extracted information (i.e., the information I embedded in the image P2).

In this manner, the information processing device 100 of this embodiment determines the final partial information items for every identifier based on the likelihood factor of the extracted information by using the embedded information extract function described above, and it is possible to extract the embedded information I with sufficient accuracy from the image P2 in which the information I is embedded repeatedly.

The information processing device 100 uses the formula (1) "x=(axi+bxj+m)mod N" in which the respective values of the integers a, b, and m, and the number N of the partial information items of the information I are substituted, which is the same as in the information embedding function, and computes the identifier x (x: an integer ranging from 0 to (N−1)) of the partial information items extracted from the division image based on the coordinate value (i, j) of the division image.

Next, the information processing device 100 classifies the extracted information items according to each computed identifier, and generates the information group which represents candidates for determining final partial information items. At this time, the information group which represents the candidates for determining final partial information items and is detected for each computed identifier is temporarily stored in the memory unit 46 (or the RAM of the main memory unit 12) in the form of a list or the like.

In the information processing device 100 of this embodiment, with respect to the information items of the candidates for determining the final partial information item of the selected identifier x, the information processing device 100 of this embodiment computes the product of the likelihood factors of the candidates as being likely to be bit '0' and the product of the likelihood factors of the candidates as being likely to be bit '1'.

The information processing device 100 compares the multiplication results between bit '0' case and bit '1' case, and determines the extracted partial information item with the larger multiplication result as being the final partial information item.

FIG. 7 is a flowchart for explaining the operation of the embedded information extract function in the first embodiment of the invention.

The information processing device 100 of this embodiment loads the embedded information extract processing program from the auxiliary memory unit 13 to the RAM of the main memory unit 12, and causes the control unit 11 to execute the program.

The embedded information extract function of this embodiment causes the image input unit 41 to input the image P2 in which the information I is embedded (S301), and causes the image dividing unit 42 to divide the input image P2 into a number of image regions (S302).

Next, the embedded information extract function causes the information extracting unit 43 to perform the DCT of the division image, and extract the partial information items of the information I embedded by the information embedding function (S303).

Next, the embedded information extract function causes the total information forming unit 44 to compute the identifiers of the partial information items extracted based on the position (i, j) of the division image in the two-dimensional space coordinates, using the formula 1 used by the information embedding function at the time of assigning the partial information items to the division images.

Subsequently, the embedded information extract function causes the total information forming unit 44 to classify the repeatedly extracted partial information items according to each computed identifier, and to determine the candidate information group for determining the final partial information items (S304).

Finally, the embedded information extract function causes the extracted information determining unit 45 to compute the likelihood factor (which is the likelihood factor of the candidate information group determined by the total information forming unit 44), determine the partial information items for every identifier based on the computed likelihood factor by using the maximum likelihood estimate method, and determine the final extracted information (S305).

The method of assigning the embedded information items to division images arranged in a rectangular lattice formation has been explained in the above embodiment. Next, the method of assigning the embedded information to division images of two or more pages or to division images arranged in a non-rectangular lattice formation will be explained with reference to FIG. 8.

FIG. 8 shows an example of the state where partial information items are assigned to division images of two or more pages in a modification of the first embodiment of the invention.

In this modification, assignment of partial information items is performed over two or more pages by the information embedding function of the first embodiment. At this time, the information embedding function of the information processing device causes the information assigning unit 25 to assign the x-th partial information item (which is determined by the formula: $x=(axi+bxj+cxk+m) \bmod N$) to the division image located at the two-dimensional space coordinates (i, j) in the image P1, and store the association of the division image and the partial information item in the memory unit 28. In the above formula, "a", "b", "i", "j", and "m" are the same as in the first embodiment, "k" is the number of pages, and "c" is a predetermined integer that has an integral value which meets the condition 1 in the information embedding function of the first embodiment, namely the number N of the partial information items of the information I and the predetermined integer c are relatively prime.

In the example of FIG. 8, the number N of the partial information items of the information I is set to N=17 assuming that the information I consists of 17 bits of information, the division images of plural pages are located in two-dimensional space of 4 rows and 4 columns, the predetermined integers a, b, c, and m which meet the conditions (1) and (2) are set to a=5, b=3, c=2, and m=0, and the formula (1) used by the information assigning unit 25 is set to "$x=(5i+3j+2k) \bmod 17$".

As is apparent from FIG. 8, the information assigning unit 25 computes the identifier x (x: an integral value ranging from 0 to 16) of the partial information items assigned to the division image of the k-th page located at the two-dimensional coordinates (i, j) by using the formula of "$x=(5i+3j+2k) \bmod 17$" based on the coordinate value (i, j) of the division image of the k-th page.

As a result, the information assigning unit 25 assigns all the 0th to 16th partial information items of the information I to each of the division images of the respective pages which correspond to the same location in the two-dimensional space coordinates, based on the computed identifier x.

For example, the 0th partial information item ($0=(5\times0+3\times0+2\times0) \bmod 17$) is assigned to the division image of the 1st page (k=0) located at (0, 0), the 2nd partial information item ($2=(5\times0+3\times0+2\times1) \bmod 17$) is assigned to the division image of the 2nd page (k=1) located at (0, 0), and the 4th partial information items ($4=(5\times0+3\times0+2\times2) \bmod 17$) is assigned to the division image of the 3rd page (k=2) located at (0, 0). All the 0th to 16th partial information items appear in the division image group up to the 17th page (k=16).

As shown in FIG. 8, the alignment of the 0th to 16th partial information items assigned to the respective division images in the division image group of each page corresponding to the same position (or the sequence of the partial information items appearing in the division image of each page corresponding to the same position) differs. All the partial information items of the information I are assigned uniformly to the division images of two or more pages.

The information assigning unit 25 of this modification assigns the partial information items to the division images using the formula "$x=(axi+bxj+cxk+m) \bmod N$" which satisfies the condition (1), which enables all the partial information items of the information I to be assigned to the division images of the same position (coordinate value (i, j)) of each page uniformly.

Therefore, the information assigning unit 25 of this modification can assign all the partial information items of the information I equally over two or more pages, and can improve the extraction accuracy of each partial information item. This method of assigning partial information items is advantageously usable for embedding information I equally in document images in which the same characters or figures exist at the same positions, such as presentation data. Because the information I is embedded over two or more pages, the amount of information being embedded can be increased and the extraction accuracy of the embedded information I can be improved.

Figure 9:
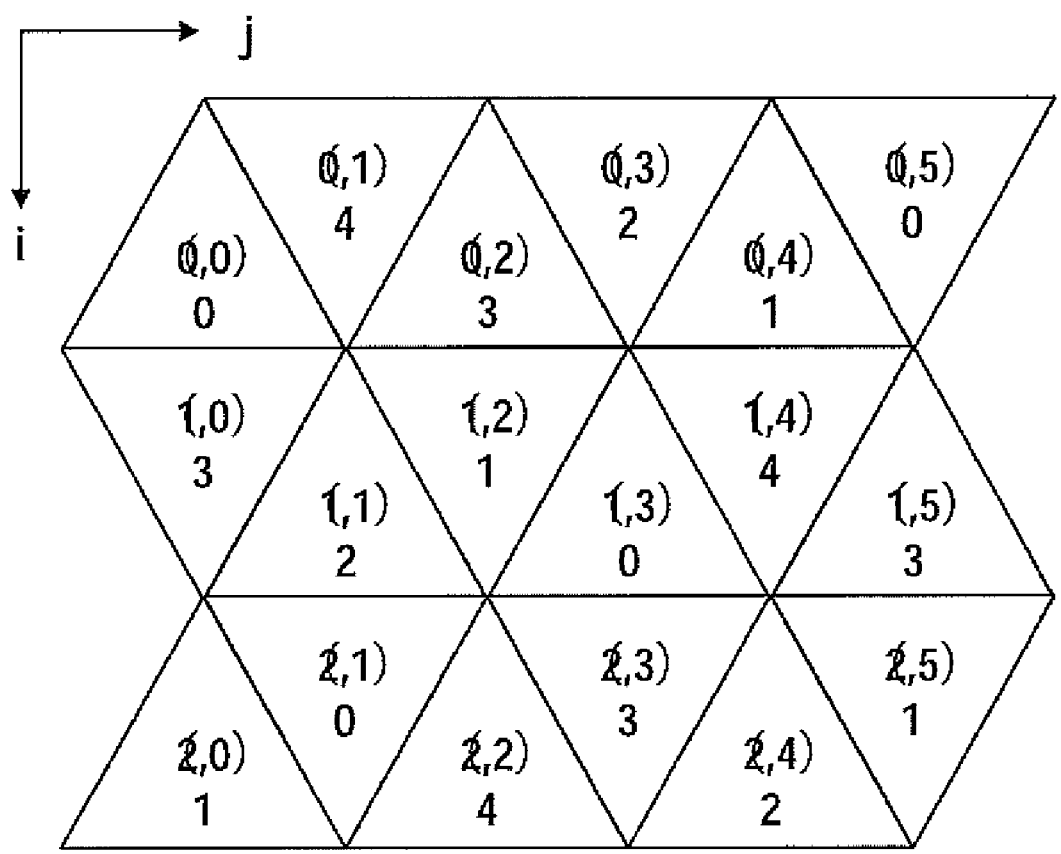
FIG. 9 is a diagram showing an example of the state where partial information items are assigned to division images arranged in a triangular lattice formation in a modification of the first embodiment of the invention.

FIG. 9 shows an example of the state where partial information items are assigned to division images arranged in a triangular lattice formation in a modification of the first embodiment of the invention.

Figure 10:
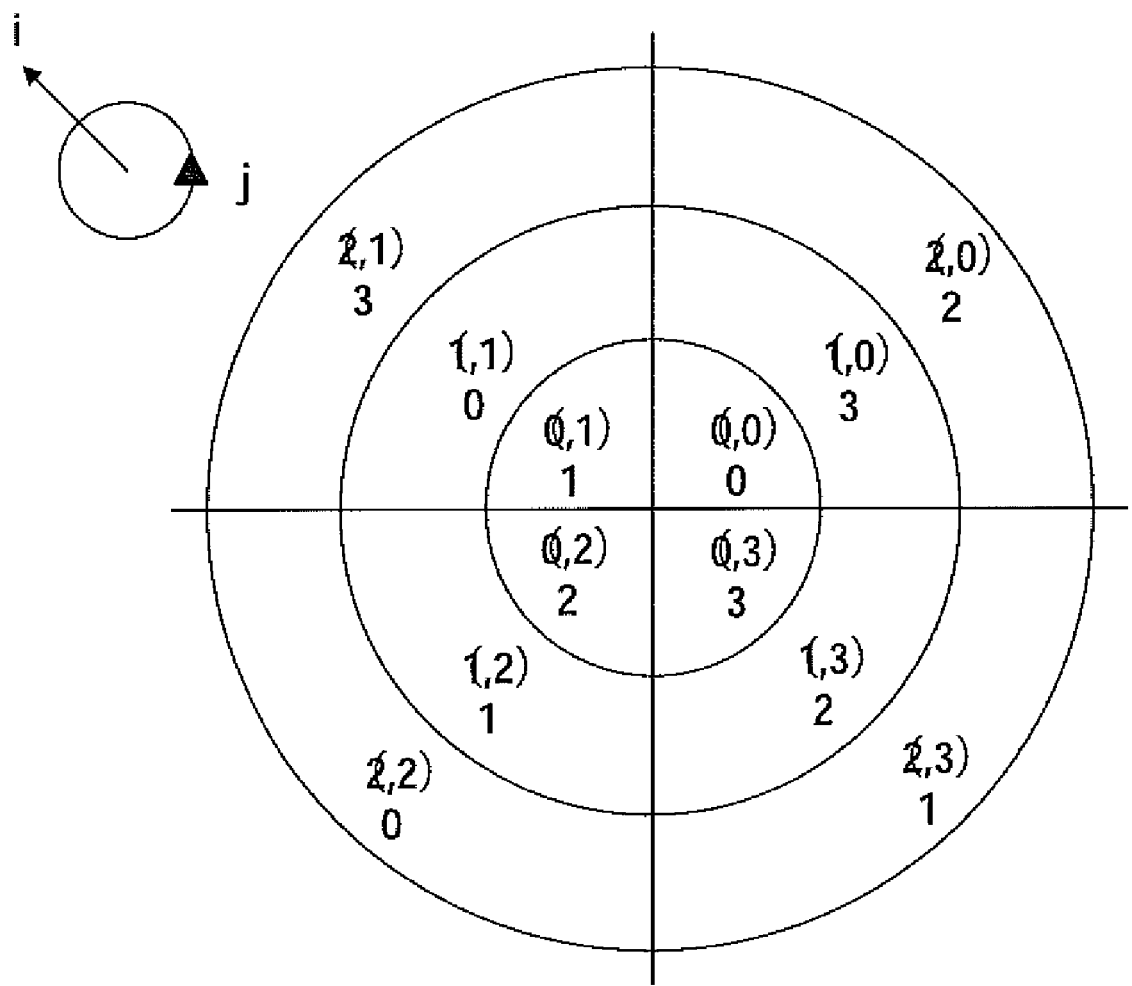
FIG. 10 is a diagram showing an example of the state where partial information items are assigned to division images on the polar coordinates in a modification of the first embodiment of the invention.

FIG. 10 shows an example of the state where partial information items are assigned to division images on polar coordinates in a modification of the first embodiment of the invention.

In the example of FIG. 9, (i, j) within each triangle denotes an identifier of the division image, and the number immediately below the triangular identifier denotes an identifier of the partial information item which is assigned to the triangular division image.

In the example of FIG. 9, the information I to be embedded is divided into five partial information items, and the x-th partial information item ($x=(3i+4j) \bmod 5$) is assigned to the triangular division image located at the two-dimensional space coordinates (i, j).

In the example of FIG. 10, (i, j) within each region denotes an identifier of the region, and the number immediately below the region identifier denotes an identifier of the partial information item being assigned to the region.

In the example of FIG. 10, the information I to be embedded is divided into four partial information items, and the x-th partial information item (x=(i+3j)mod 4) is assigned to the division image (region) located at the polar coordinates (i, j).

In this modification, an arbitrary method of dividing the image P1 may be used, and all the partial information items can be made to appear in the direction of the axis of one of the two-dimensional space coordinates (i, j) by the dividing method and the assignment of the two-dimensional space coordinates (i, j). Namely, the region division and the coordinates assignment may be carried out in conformity with the pattern of appearance of the regions of the image P1 in which the information I can be embedded.

The two-dimensional space coordinates (i, j) of the above examples vary continuously. Alternatively, the identifier (i, j) may be used to vary discontinuously without giving the specific coordinates. It is not necessary that all the division images have the same form. The space in which the region division is performed may be not the picture element space but the frequency space.

Figure 11:
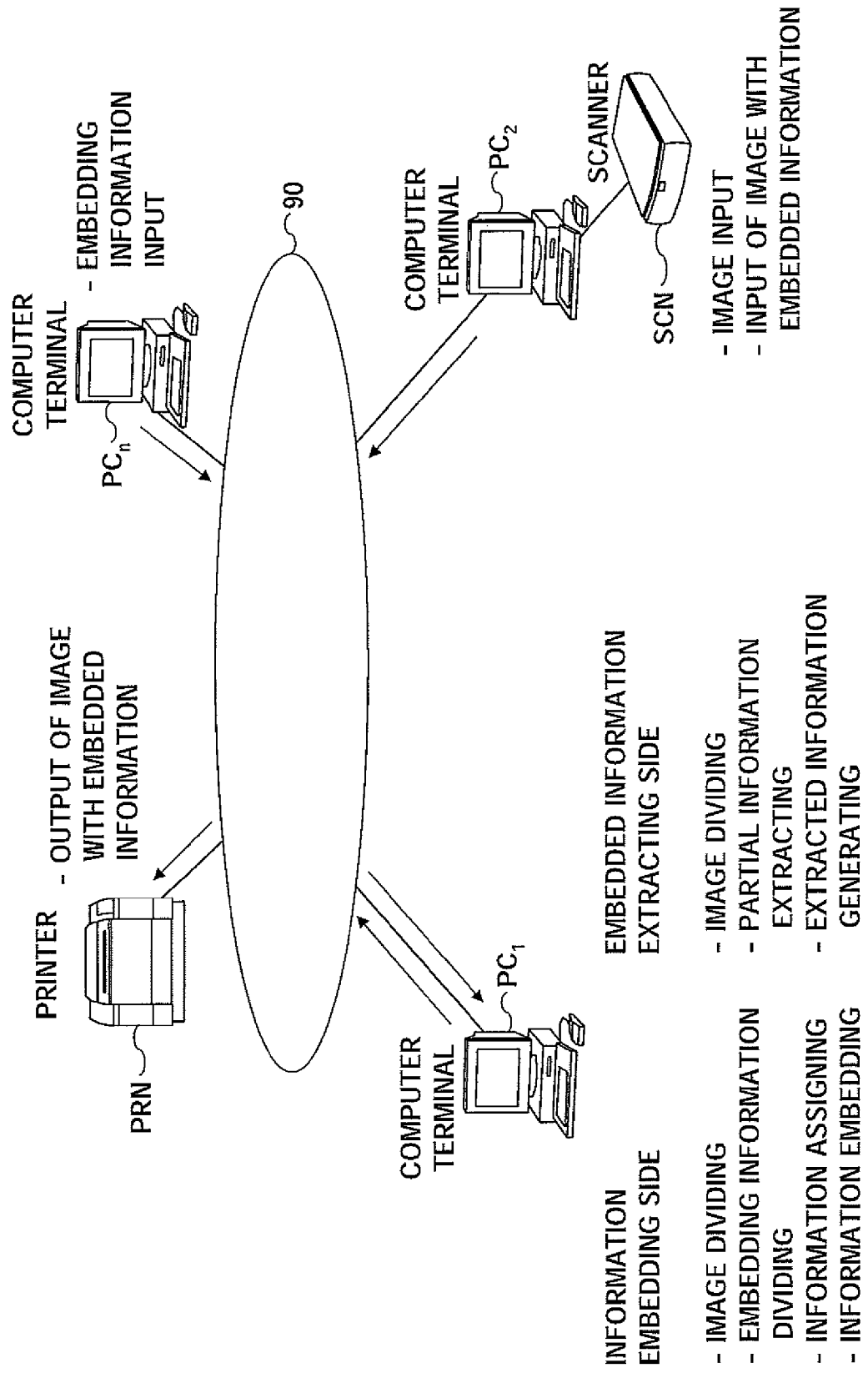
FIG. 11 is a diagram showing the composition of an information processing system in a modification of the first embodiment of the invention.

FIG. 11 shows the composition of an information processing system to which the information processing device 100 having the information embedding and the embedded information extract functions of this embodiment is connected.

The information processing system of FIG. 11 includes a computer terminal (information processing device) PC1 which has the information embedding and the embedded information extract functions of this embodiment, a computer terminal PC2 to which a scanner (image reader) SCN which reads an image P1 in which information I is embedded or an image P2 with the embedded information I, is connected, a computer terminal PCn which inputs the information I to be embedded, and a printer (image forming device) PRN which outputs the image P2 with the embedded information I. The respective terminals of the information processing system are connected to a network (data communication network) 90 which is constructed by wired or wireless transmission lines, such as LAN or WAN.

Because of the above-described composition of the information processing system, even if the information processing device 100 does not have the input function of information I to be embedded or the input function of the image P1 in which the information I is embedded and the image P2 with the embedded information I, it is possible for the information processing system of this embodiment to carry out the information embedding and the embedded information extract functions of the first embodiment.

In the above example, only one information processing device PC1 has the information embedding and the embedded information extract functions. Alternatively, the information processing system may be arranged so that separate information processing devices 100 have the information embedding function and the embedded information extract function.

Next, a second embodiment of the invention will be explained.

In the information processing device of this embodiment, rotation of an image in which information is embedded is considered, and when the image is rotated by 90 degrees, the information embedding function and the embedded information extract function are carried out.

Similar to the first embodiment, the information embedding function of this embodiment includes an image dividing unit 22, an information dividing unit 24, an information assigning unit 25, a memory unit 28, and an information embedding unit 26. The difference between this embodiment and the first embodiment is that the information assigning unit 25 of this embodiment performs assignment of the partial information items corresponding to the image rotated by 90 degrees.

FIG. 12 shows an example of the state where the image in which the partial information items are assigned in the second embodiment of the invention is rotated by 90 degrees.

Similar to the first embodiment, the information assigning unit 25 of this embodiment is arranged to assign the s-th partial information item (x=(axi+bxj+m)mod N) to the division image located at the two-dimensional space coordinates (i, j) in the image P1 by using the formula (1).

However, in order to be adapted to the image rotated by 90 degrees, the method of determining the integers a and b (the condition which is satisfied by the integers a and b) in the formula (1) differs from the first embodiment. The integers a and b used by the information assigning unit 25 must meet the following conditions (1) and (2).

Condition (1)

The number N of the partial information items of the information I and the predetermined integer a are relatively prime, and the number N of the partial information items of the information I and the predetermined integer b are relatively prime. The expression "relatively prime" means that the largest common factor of the number N of the partial information items of the information I and the predetermined integer a or b is set to 1.

Condition (2):

The number N of the partial information items of the information I and the predetermined integers a and b must meet the following formula (4):

$$0=(a^2+b^2)(\mod) N \quad (4)$$

The information assigning unit 25 of this embodiment uses the formula 1 into which the values of the integers a and b which meet the condition (1) and the condition (2), the integer m, and the number N of the partial information items of information I are substituted, and computes the identifier X of the partial information item assigned to the division image (x: an integer ranging from 0 to (N−1)) based on the coordinate value (i, j) of the division image.

In the example of FIG. 12, the number N of the partial information items of the information I is set to N=17 assuming that the information I consists of 17 bits of information, the division images are located in two-dimensional space of 17 rows and 17 columns, the predetermined integers a, b, and m satisfying the condition (1) are set to a=5, b=3, and m=0, and the formula 1 used by the information assigning unit 25 of this embodiment is set to "x=(5i+3j)mod 17". However, for the sake of description, only partial division images of 9 rows and 9 columns (part of division images of 17 rows and 17 columns) are illustrated in FIG. 12.

As shown in the information assigning state "zero degree rotation" of FIG. 12, the information assigning unit 25 of this embodiment uses the formula 1 "x=(5i+3j)mod 17", computes the identifier x (x: an integer ranging from 0 to 16) of the partial information item assigned to the division image located at (i, j) based on the coordinate value (i, j) of the division image, and assigns all the 0th to 16th partial information items of the information I to continuous division images arranged in rows and columns based on each computed identifier x.

As a result, as shown in FIG. 12, each time the 0th to 16th partial information items are embedded repeatedly, the alignment of the 0th to 16th partial information items assigned to each division image differs, and all the partial information items of the information I are assigned uniformly.

In this manner, the information assigning unit 25 of this embodiment is arranged to assign the partial information items to the division images by using the formula (1) satisfying the condition (1), and, similar to the first embodiment, all the partial information items of the information I can be assigned equally, and the extraction accuracy of each partial information item can be improved.

As shown in the information assigning state "90 degree rotation" of FIG. 12, the information assigning unit 25 is arranged to assign the partial information items to the division images so that the relative position of the division images in which the partial information items are embedded remains unchanged in the two-dimensional space even if the image P2 with the embedded information I is rotated by 90 degrees.

Specifically, in the example of "zero degree rotation" of FIG. 12, the 13th, 15th, and 0th partial information items of the information I are respectively assigned to the three division images located at (3, 5), (4, 4), and (5, 3). In contrast, in the example of "90 degree rotation (counter-clockwise)" of FIG. 12, the 13th, 15th, and 0th partial information items of the information I are respectively assigned to the three division images located at (3, 3), (4, 4), and (5, 5).

In this manner, the information assigning unit 25 of this embodiment uses the formula (1) satisfying the conditions (1) and (2) and assigns the partial information items to the division images, so that the relative position of the division images in which the partial information items are embedded remains unchanged in the two-dimensional space even if the image P2 with the embedded information I is rotated by 90 degrees.

The information embedding function of this embodiment can assign all the partial information items of the information I to the division images which constitute respective rows and columns of the image P1 by using the information assigning unit 25, and can assign the partial information items to the division images so that all the partial information items of the embedded information I can be extracted with sufficient accuracy even when the image P2 in which the information I is embedded is rotated by 90 degrees.

Similar to the first embodiment, the embedded information extract function of this embodiment includes an image dividing unit 42, a partial information extracting unit 43, and an extracted information generating unit 45. The difference between this embodiment and the first embodiment is that the extracted information generating unit 45 of this embodiment performs generation of the extracted information corresponding to the image rotated by 90 degrees.

FIG. 13 is a diagram for explaining a method of determining the partial information items extracted from the image rotated by 90 degrees in the second embodiment of the invention.

The extracted information generating unit 45 of this embodiment is the same as that of the first embodiment in that it generates the information I embedded in the image P2, based on the extracted partial information items. However, in order to be adapted to the image rotated by 90 degrees, the method of computing the identifier x of the extracted partial information items differs from that of the first embodiment using the formula (1).

The extracted information generating unit 45 of this embodiment is arranged to compute the identifier x of the partial information items extracted from the rotated image P2, assuming that the image P2 is rotated by 0 degrees, 90 degrees, 180 degrees, or 270 degrees.

The formula used to compute the identifier x of the partial information items by the extracted information generating unit 45 of this embodiment is as follows.

In a case of 0-degree rotation, $$x = (axi + bxj + m) \bmod N \quad (1\text{-}1)$$

In a case of 90-degree rotation, $$x = (bxi - axj + m) \bmod N \quad (1\text{-}2)$$

In a case of 180-degree rotation, $$x = (-axi - bxj + m) \bmod N \quad (1\text{-}3)$$

In a case of 270-degree rotation, $$x = (-bxi + axj + m) \bmod N \quad (1\text{-}4)$$

The extracted information generating unit 45 uses the above formulas (1-1) to (1-4) and computes the identifier x of the extracted partial information item based on the position (i, j) of the division image in the two-dimensional space coordinates, for each of the cases of 0-degree rotation, 90-degree rotation, 180-degree rotation, and 270-degree rotation of the image P2 with the embedded information I.

Next, the extracted information generating unit 45 classifies the repeatedly extracted partial information items according to each computed identifier and generates, for each of the four rotation patterns, the candidate information groups for determining the final partial information items, similar to the first embodiment.

As a result, the extracted information generating unit 45 determines the candidate extracted partial information items for every identifier based on the likelihood factors of the extracted information items similar to the first embodiment, and generates the candidate extracted information items corresponding to the four rotation patterns for every identifier (which include the four information items: 1st candidate extracted information item for 0-degree rotation pattern, 2nd extracted information item for 90-degree rotation pattern, the 3rd candidate extracted information item for 180-degree rotation pattern, and 4th candidate extracted information item for 270-degree rotation pattern) as shown in FIG. 13.

In this manner, the extracted information generating unit 45 of this embodiment generates a number of candidate extracted information items because the four patterns of image rotation by 90 degrees are assumed.

Then, the extracted information generating unit 45 of this embodiment determines the information item with the largest likelihood factor from among the four generated information items as being the final extracted information. For this purpose, the information embedding unit 26 is arranged to add a specific signal to the partial information items when they are embedded in the division images (for example, the predetermined data '0' or '1' is added to the lowest rank bit of each partial information item). The repeatability of the specific signal at the time of extracting the partial information items is measured. The likelihood factor of each information item is generated based on the measured repeatability. The final extracted information is determined based on the likelihood factor.

Specifically, as in the example of FIG. 13, suppose that the likelihood factor of the 1st candidate extracted information is 0.287, the likelihood factor of the 2nd candidate extracted information is 0.211, the likelihood factor of the 3rd candidate extracted information is 0.252, and the likelihood factor of the 4th candidate extracted information is 0.672. The likelihood factors of the four information items (the 1st to 4th extracted information items) are compared (0.672>0.287>0.252>0.211). Because the likelihood factor of the 4th candidate extracted information is the largest as shown in FIG. 13, the 4th candidate extracted information is determined as being the final extracted information.

FIG. 14 is a flowchart for explaining a method of determining final partial information items from the image rotated by 90 degrees in the second embodiment of the invention. The procedure shown in FIG. 14 is equivalent to the step S304 shown in FIG. 7.

The information processing device 100 of this embodiment selects the division image located at the two-dimensional space coordinates (i, j) of the image P2 (S601).

Next, the information processing device 100 uses the formula (1-1) "x=(axi+bxj+m)mod N" in which the values of the integers a, b, m, and the number N of the partial information items of the information I are substituted, which is the same as in the information embedding function, and computes the identifier x (x: an integer ranging from 0 to (N−1)) of the partial information item extracted from the division image and assumed for 0-degree rotation, based on the coordinate value (i, j) of the division image (S602).

Next, the information processing device 100 uses the formula (1-2) "x=(bxi−axj+m)mod N" in which the values of the integers a, b, m, and the number N are substituted, and computes the identifier x (x: an integer ranging from 0 to (N−1)) of the partial information item extracted from the division image and assumed for 90-degree rotation, based on the coordinate value (i, j) of the division image (S603).

Next, the information processing device 100 uses the formula (1-3) "x=(−axi−bxj+m)mod N" in which the values of the integers a, b, m, and the number N are substituted, and computes the identifier x (x: an integer ranging from 0 to (N−1)) of the partial information item extracted from the division image and assumed for 180-degree rotation, based on the coordinate value (i, j) of the division image (S604).

Next, the information processing device 100 uses the formula (1-4) "x=(−bxi+axj+m)mod N" in which the values of the integers a, b, m, and the number N are substituted, and computes the identifier x (x: an integer ranging from 0 to (N−1)) of the partial information item extracted from the division image and assumed for 270-degree rotation, based on the coordinate value (i, j) of the division image (S605).

The information processing device 100 classifies the repeatedly extracted information items according to each computed identifier, and generates the information items which are candidates for determining final partial information items for each of the four rotation patterns. At this time, the information which is the candidate for determining final partial information items overlapping for each identifier is temporarily stored in the RAM of the main memory unit 12 in the form of a list, etc.

The information processing device 100 determines whether all the division images of the image P2 are selected (S606).

When all the division images are selected at the step S606, the information processing device 100 judges that extraction of all the partial information items of the image P2 is completed, and terminates the procedure.

When all the division images are not selected at the step S606, the information processing device 100 performs the steps S602-S605 to the non-selected division image until all the division images of the image P2 are selected.

Figure 15:
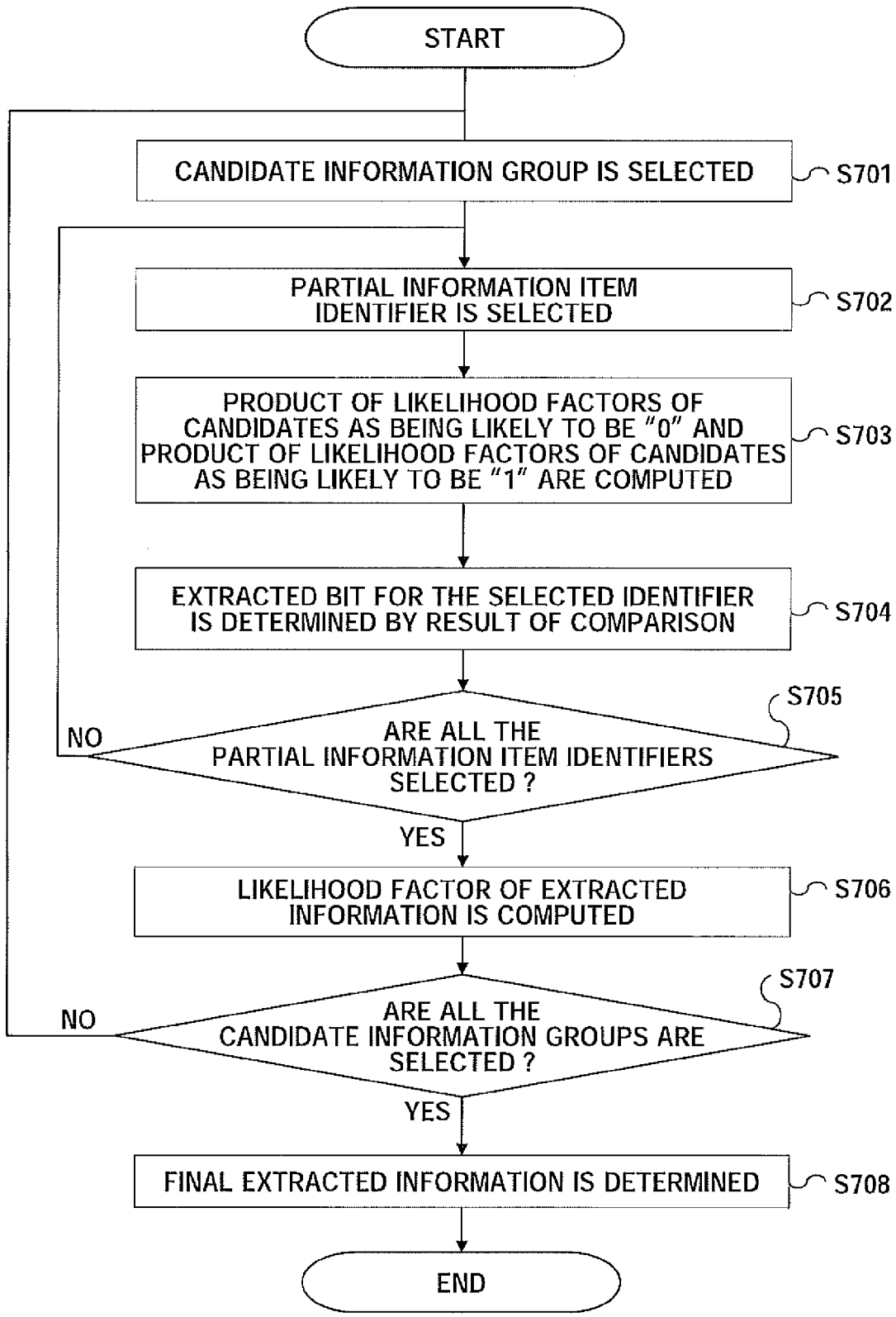
FIG. 15 is a flowchart for explaining the procedure which determines final extracted information from the extracted information items generated from the image rotated by 90 degrees in the second embodiment of the invention.

FIG. 15 is a flowchart for explaining the procedure which determines final extracted information from the extracted information items generated from the image rotated by 90 degrees in the second embodiment of the invention. The procedure shown in FIG. 15 is equivalent to the step S305 shown in FIG. 7.

The information processing device 100 of this embodiment selects one of the candidate information groups for determining the final partial information items generated for each of the four rotation patterns (S701).

Next, the information processing device 100 selects the identifier x (x: an integer ranging from 0 to (N−1)) of the partial information item in the selected candidate information group (S702).

Next, with respect to the information items of the candidates for determining the final partial information item of the selected identifier x, the information processing device 100 computes the product of the likelihood factors of the candidates as being likely to be bit '0' and the product of the likelihood factors of the candidates as being likely to be bit '1' (S703).

The information processing device 100 compares the multiplication results of the likelihood factors between bit '0' case and bit '1' case, and determines the extracted partial information item with the larger multiplication result as being the final partial information item (S704).

The information processing device 100 determines whether all the identifiers x of the partial information items of the information I embedded in the image P2 are selected (S705).

When all the identifiers x of the partial information items are not selected at the step S705, the information processing device 100 performs the steps S703 and S704 to the partial information items of the non-selected identifier x until all the identifiers x of the partial information items are selected.

When all the identifiers x of the partial information items are selected at the step S705, the information processing device 100 judges that the final partial information items for all the identifiers are determined and the extracted information items in one of the four candidate information groups are generated, and computes the likelihood factors of the generated extracted information items (S706).

Next, the information processing device 100 determines whether all the four candidate information groups are selected (S707).

When all the four candidate information groups are not selected at the step S707, the information processing device 100 performs the steps S702-S706 to the non-selected candidate information group until all the four candidate information groups are selected.

When all the four candidate information groups are selected at the step S707, the information processing device 100 compares the likelihood factors of the four extracted information items, and determines the extracted information item with the largest likelihood factor as being the final extracted information (S708).

FIG. 16 shows an example of the state where the image having the partial information items assigned is rotated by 90 degrees in a modification of the second embodiment of the invention.

Apart from the second embodiment, the information embedding function of this modification is arranged so that the information assigning unit 25 uses a different method of determining the integers a and b in the formula (1) in order to be adapted for the image rotated by 90 degrees.

The integers a and b used by the information assigning unit 25 of this modification must satisfy the following conditions (1) and (2').

Condition (1):

The number N of the partial information items of the information I and the integer a are relatively prime, and the number N of the partial information items of the information I and the integer b are relatively prime. The "relatively prime" here means that the largest common factor of the number N and the integer a or b is set to 1.

Condition (2'):

The sum $(a^2+b^2)$ of the square of the integer a and the square of the integer b, and the number N of the partial information items of the information I are relatively prime. The "relatively prime" here means that the largest common factor of the number N and the sum $(a^2+b^2)$ is set to 1.

The information assigning unit 25 of this modification uses the formula (1) in which the values of the integers a and b which satisfy the condition (1) and the condition (2'), the integer m, and the number N of the partial information items of the information I are substituted, and computes the identifiers x (x: an integer ranging from 0 to N−1) of the partial information items assigned to the division image based on the coordinate value (i, j) of the division image.

In the example of FIG. 16, the number N of the partial information items of the information I is set to N=13 assuming that the information I consists of 13 bits of information, the division images are located in a two-dimensional space of 13 rows and 13 columns, the predetermined integers a, b, and m satisfying the conditions (1) and (2') are set to a=5, b=3, and m=0, and the formula 1 used by the information assigning unit 25 of this embodiment is set to "x=(5i+3j)mod 13". However, for the sake of description, only partial division images of 9 rows and 9 columns (part of division images of 13 rows and 13 columns) are illustrated in FIG. 16.

As shown in the information assigning state "zero degree rotation" of FIG. 16, the information assigning unit 25 of this embodiment uses the formula (1) "x=(5i+3j)mod 13", and computes the identifier x (x: an integer ranging from 0 to 12) of the partial information item assigned to the division image located at the coordinates (i, j), based on the coordinate value (i, j) of the division image.

Then, the information assigning unit 25 assigns all the 0th to 12th partial information items of the information I to continuous division images arranged in rows and columns based on each computed identifier x.

As a result, as shown in FIG. 16, each time the 0th to 12th partial information items are embedded repeatedly, the alignment of the 0th to 12th partial information items assigned to each division image differs, and all the partial information items of the information I are assigned uniformly.

In this manner, the information assigning unit 25 is arranged to assign the partial information items to the division images by using the formula (1) satisfying the condition (1), similar to the first embodiment, all the partial information items of the information I can be assigned equally, and the extraction accuracy of each partial information item can be improved.

As shown in the information assigning state "90-degree rotation" of FIG. 16, the information assigning unit 25 is arranged to assign the partial information items to the division images so that, after the image P2 with the embedded information I is rotated by 90 degrees, all the partial information items of the information I appear at the locations in the two-dimensional space corresponding to the locations where the partial information item of the same identifier is embedded repeatedly before rotation.

Specifically, in the example of "zero angle of rotation" of FIG. 16, the 0th partial information item of the information I is assigned repeatedly to the five division images located at (0, 0), (2, 1), (4, 2), (6, 3), and (8, 4). In contrast, in the example of "90-degree rotation (counterclockwise)" of FIG. 16, the 11th, the 10th, the 9th, the 8th, and the 7th partial information items are assigned to the five division images located at (0, 0), (2, 1), (4, 2), (6, 3), and (8, 4). Namely, after the image P2 with the embedded information I is rotated by 90 degrees all the partial information items of the information I appear at the locations in the two-dimensional space corresponding to the locations where the partial information item of the same identifier is embedded repeatedly before rotation.

The information assigning unit 25 uses the formula (1) satisfying the conditions (1) and (2') and assigns the partial information items to the division images, and even if the image P2 with the embedded information I is rotated by 90 degrees, in two-dimensional space coordinates, partial information items are assigned to a division image so that all the partial information items of information I embedded at the same arrangement as arrangement of the partial information items of the same identifier before rotation may appear.

Therefore, even when the image is rotated by 90 degrees, the partial information items are assigned to the division images by the information assigning unit 25, so that all the partial information items of the embedded information I can be extracted with sufficient accuracy.

Next, FIG. 17 is a diagram for explaining a method of determining the partial information items extracted from the image rotated by 90 degrees in a modification of the second embodiment of the invention.

The difference of this modification from the second embodiment is that the embedded information extract function uses the method of determining the final extracted information from among the first to fourth candidate extracted information items. The method of generating the first to fourth candidate extracted information items in this modification is the same as the previously described one.

As is apparent from the arrangement of the partial information items after the 90-degree rotation shown in FIG. 16, when the likelihood of bit '0' and the likelihood of bit '1' are nearly at the same level in the embedded information I of the images P2 rotated by 90 degrees and 270 degrees, the likelihood factors of the 2nd and 4th candidate extracted information items (90-degree rotation and 270-degree rotation) are comparatively large.

In consideration of the above matter, the extracted information generating unit 45 of this modification is arranged as follows. First, the extracted information generating unit 45 compares the likelihood factors (A1 to A4) of the four candidate extracted information items (supposed for images rotated by 90 degrees), and selects the two candidate extracted information items with the larger likelihood factor. In the example of FIG. 17, because A2=A4>A1=A3, the 2nd and 4th candidate extracted information items are selected.

Next, the extracted information generating unit 45 of this modification computes repeatability factors (B) of the selected two candidate extracted information items. Each repeatability factor indicates the repeatability of a specific signal of the extracted information item. The extracted information generating unit 45 compares the repeatability factors (B) of the two candidate extracted information items, and determines the extracted information item with the larger repeatability factor as being the final extracted information. In the example of FIG. 17, because B2<B4, the 4th candidate extracted information item is determined as being the final extracted information.

Specifically, in the example of FIG. 17, the likelihood factors (A1, A3) of the 1st and 3rd candidate extracted information items are 0.0119, and the likelihood factors (A2, A4) of the 2nd and 4th candidate extracted information items are 0.0457. By comparing the likelihood factors (A1-A4) of the 1st to 4th candidate extracted information items (0.0119<0.0457), the 2nd and 4th candidate extracted information items with the larger likelihood factor (A2, A4) are first selected.

Next, in the example of FIG. 17, the repeatability factors of the selected information items are computed, so that the repeatability factor (B2) of the 2nd candidate extracted information item is 0.432, and the repeatability factor (B4) of the 4th candidate extracted information item is 0.677. By comparing the repeatability factor (B2) of the 2nd extracted information and the repeatability factor (B4) of the 4th extracted information (0.432<0.677), the 4th candidate extracted information item with the larger repeatability factor (B4) is determined as being the final extracted information.

Figure 18:
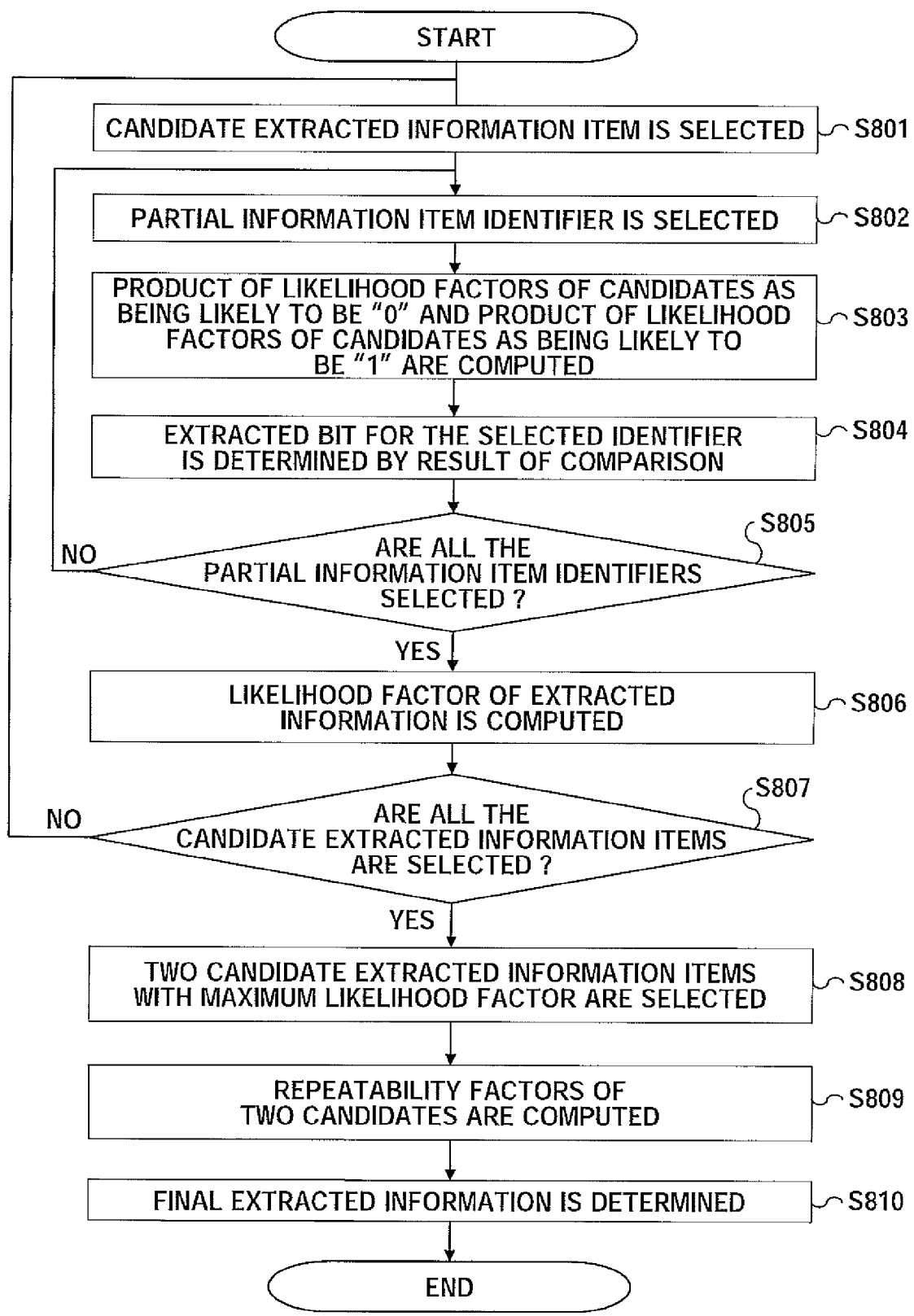
FIG. 18 is a flowchart for explaining the procedure which determines final extracted information from the extracted information items generated from the image rotated by 90 degrees in a modification of the second embodiment of the invention.

FIG. 18 is a flowchart for explaining the procedure which determines final extracted information from the extracted information items generated from the image rotated by 90 degrees in a modification of the second embodiment of the invention. The procedure shown in FIG. 18 is equivalent to the step S305 shown in FIG. 7.

The information processing device 100 of this modification selects one of the candidate information groups for determining the final partial information items generated for each of the four rotation patterns (S801).

Next, the information processing device 100 selects the identifier x (x: an integer ranging from 0 to (N−1)) of the partial information item in the selected candidate information group (S802).

Next, with respect to the information items of the candidates for determining the final partial information item of the selected identifier x, the information processing device 100 computes the product of the likelihood factors of the candidates as being likely to be bit '0' and the product of the likelihood factors of the candidates as being likely to be bit '1' (S803).

The information processing device 100 compares the multiplication results of the likelihood factors between the bit '0' case and the bit '1' case, and determines the extracted partial information item with the larger multiplication result as being final partial information item (S804).

The information processing device 100 determines whether all the identifiers x of the partial information items of the information I embedded in the image P2 are selected (S05).

When all the identifiers x of the partial information items are not selected at the step S805, the information processing device 100 performs the steps S803 and S804 to the partial information items of the non-selected identifier x until all the identifiers X of the partial information items are selected.

When all the identifiers x of the partial information items are selected at the step S805, the information processing device 100 judges that the final partial information items for all the identifiers are determined and the extracted information items in one of the four candidate information groups are generated, and computes the likelihood factors (A) of the generated extracted information items (S806). For example, the likelihood factors (A) computed at this step are a product of the likelihood factors of bit '0' or bit '1' of the extracted partial information items.

Next, the information processing device 100 determines whether all the four candidate information groups are selected (S807).

When all four candidate information groups are not selected at the step S807, the information processing device 100 performs the steps S802-S306 to the non-selected candidate formation group until all four candidate information groups are selected.

When all four candidate information groups are selected at the step S807, the information processing device 100 compares the likelihood factors (A) of the four extracted information items, and selects the two extracted information items with the larger likelihood factor (S808).

Next, the information processing device 100 computes the repeatability factors (B) of the selected two extracted information items (S809).

The information processing device 100 compares the computed repeatability factors of the two extracted information items, and determines the extracted information item with the larger repeatability factor as being the final extracted information (S810).

The information embedding and embedded information extract functions of the present invention are applicable to not only still images but also multimedia data of video, digital audio, text, etc. In a case of embedding information I in video, the video information is divided by the three-dimensional space of length, width, and time, and a three-dimensional identifier is associated therewith. A partial information item which is determined based on a value of a remainder obtained when the sum of an integer m and an inner product of the identifier and a specific integer vector θ is divided by the number N of the partial information items of the information I is assigned to each division video item. If the respective elements of the number N and the integer vector θ are relatively prime at this time, all the partial information items appear in the direction along the axis of the coordinates of the identifier. In a case of embedding information I in digital audio, the audio information is divided into a number of regions in the two-dimensional space of time and frequency. The method of embedding the information I may be considered with the use of a two-dimensional identifier. In a case of embedding information I in text, the method of embedding the information I may be considered with the use of an identifier indicating one of tree-structured hierarchical levels including chapter, paragraph, sentence, word, etc.

The information embedding and embedded information extract functions of the present invention are applicable to multimedia data in which images, video, digital audio, text, etc. coexist. In such a case, a unique identifier can be generated by adding a one-dimensional identifier indicating the kind of data contained in the multimedia data to the identifier of the partial information item of the information I described above.

The present invention is not limited to the specifically disclosed embodiments, and variations and modifications may be made without departing from the scope of the present invention.

The present application is based on Japanese patent application No. 2007-187628, filed on Jul. 18, 2007, and Japanese patent application No. 2008-171634, filed on Jun. 30, 2008, the contents of which are incorporated by reference in their entirety.

What is claimed is:

1. An information processing device which embeds a number of partial information items produced from predetermined information in an image, comprising:

an image dividing unit configured to divide an image into a number of division images in a lattice formation to generate the division images;

an information assigning unit configured to assign the partial information items to the division images generated by the image dividing unit; and an information embedding unit configured to embed the partial information items assigned by the information assigning unit, in the division images, wherein the information assigning unit assigns all the partial information items to a set of division images located in a predetermined direction, and the information assigning unit is arranged to determine, with respect to a division image produced by the image dividing unit and located at two-dimensional space coordinates (i, j) corresponding to one of rows and columns of the image, a partial information item based on a value of a remainder obtained when a computation value x of the formula:

$$x=(axi+bxj+m) \bmod N,$$

where a, b, and m are predetermined integers, the number N of the partial information items and the predetermined integer a are relatively prime, and the number N of the partial information items and the predetermined integer b are relatively prime, is divided by the number N of the partial information items.

2. The information processing device according to claim 1, wherein the information assigning unit assigns all the partial information items to each of sets of division images located in mutually different directions.

3. The information processing device according to claim 1, wherein the image dividing unit divides the image into the number of division images in a rectangular lattice formation, and the information assigning unit assigns all the partial information items to a set of division images located in rows or columns which constitute the lattice formation.

4. The information processing device according to claim 1, wherein the information assigning unit assigns each partial information item to the set of division images a plurality of times and assigns all the partial information items to continuous division images.

5. The information processing device according to claim 1, wherein the image dividing unit generates the division images from the image, the number of the division images being equal to or larger than the number of the partial information items.

6. An information embedding method which embeds a number of partial information items produced from predetermined information in an image, comprising:

an image dividing step of dividing an image into a number of division images in a lattice formation to generate the division images;

an information assigning step of assigning the partial information items to the division images generated in the image dividing step; and an information embedding step of embedding the partial information items assigned in the information assigning step, in the division images, wherein the information assigning step is arranged to assign all the partial information items to a set of division images located in a predetermined direction, and the information assigning step is arranged to determine, with respect to a division image produced in the image dividing step and located at two-dimensional space coordinates (i, j) corresponding to one of rows and columns of the image, a partial information item based on a value of a remainder obtained when a computation value x of the formula:

$$x=(axi+bxj+m) \bmod N,$$

where a, b, and m are predetermined integers, the number N of the partial
information items and the predetermined integer a are relatively prime, and
the number N of the partial information items and the predetermined integer
b are relatively prime, is divided by the number N of the partial information items.

7. The information embedding method according to claim 6, wherein the information assigning step is arranged to assign all the partial information items to each of sets of division images located in mutually different directions.

8. The information embedding method according to claim 6, wherein the image dividing step is arranged to divide the image into the number of division images in a rectangular lattice formation, and the information assigning step assigns all the partial information items to a set of division images located in rows or columns which constitute the lattice formation.

9. The information embedding method according to claim 6, wherein the information assigning step is arranged to assign each partial information item to the set of division images a plurality of times and assign all the partial information items to continuous division images.

10. The information embedding method according to claim 6, wherein the image dividing step is arranged generates the division images from the image, the number of the division images being equal to or larger than the number of the partial information items.

11. A non-transitory computer-readable recording medium storing a program which, when executed by a computer, causes the computer to perform an information embedding method for use in an information processing device which embeds a number of partial information items produced from predetermined information in an image, the information embedding method comprising:

an image dividing step of dividing an image into a number of division images in a lattice formation to generate the division images;

an information assigning step of assigning the partial information items to the division images generated in the image dividing step; and an information embedding step of embedding the partial information items assigned in the information assigning step, in the division images, wherein the information assigning step is arranged to assign all the partial information items to a set of division images located in a predetermined direction, and the information assigning step is arranged to determine, with respect to a division image produced in the image dividing step and located at two-dimensional space coordinates (i, j) corresponding to one of rows and columns of the image, a partial information item based on a value of a remainder obtained when a computation value x of the formula:

$$x=(axi+bxj+m) \bmod N,$$

where a, b, and m are predetermined integers, the number N of the partial
information items and the predetermined integer a are relatively prime, and
the number N of the partial information items and the predetermined integer
b are relatively prime, is divided by the number N of the partial information items.

* * * * *